US009707870B2

(12) United States Patent
Line et al.

(10) Patent No.: US 9,707,870 B2
(45) Date of Patent: *Jul. 18, 2017

(54) FLEXIBLE SEATBACK SYSTEM

(71) Applicant: Ford Global Technologies, LLC, Dearborn, MI (US)

(72) Inventors: Johnathan Andrew Line, Northville, MI (US); Daniel Ferretti, Commerce Township, MI (US); John W. Jaranson, Dearborn, MI (US); Grant A. Compton, Livonia, MI (US); Kendrick Alden Harper, Temperance, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,047

(22) Filed: Jul. 21, 2016

(65) Prior Publication Data

US 2016/0325647 A1 Nov. 10, 2016

Related U.S. Application Data

(63) Continuation of application No. 13/749,561, filed on Jan. 24, 2013, now Pat. No. 9,409,504.

(51) Int. Cl.
*A47C 27/00* (2006.01)
*B60N 2/427* (2006.01)
(Continued)

(52) U.S. Cl.
CPC .......... *B60N 2/427* (2013.01); *B60N 2/0232* (2013.01); *B60N 2/2222* (2013.01);
(Continued)

(58) Field of Classification Search
CPC ........................ B60N 2/2222; B60N 2205/30
(Continued)

(56) References Cited

U.S. PATENT DOCUMENTS 616,178 A  12/1898  Barron
771,773 A  10/1904  Feely
(Continued)

FOREIGN PATENT DOCUMENTS

CN  201650491 U  11/2010
CN  203097995 U  7/2013
(Continued)

OTHER PUBLICATIONS

Matthew W Ing, United States Patent and Trademark Office, Non Final Office Communication re U.S. Appl. No. 13/749,561, Oct. 16, 2015, 33 pages.
(Continued)

*Primary Examiner* — Matthew Ing
(74) *Attorney, Agent, or Firm* — Vichit Chea; Price Heneveld LLP

(57) ABSTRACT

A vehicle seat suspension system includes first and second side supports defining a seatback structure. An upper component and a lower component are provided, each including at least two outwardly extending flex members. A passenger support includes a periphery operably coupled to distal ends of the flex members. An external peripheral gap is defined between the passenger support and the seatback structure.

20 Claims, 19 Drawing Sheets

(51) Int. Cl.
*B60N 2/64* (2006.01)
*B60N 2/70* (2006.01)
*B60N 2/02* (2006.01)
*B60N 2/22* (2006.01)
*B60N 2/44* (2006.01)

(52) U.S. Cl.
CPC ............ *B60N 2/4279* (2013.01); *B60N 2/449* (2013.01); *B60N 2/4492* (2015.04); *B60N 2/64* (2013.01); *B60N 2/643* (2013.01); *B60N 2/7005* (2013.01); *B60N 2/7094* (2013.01); *B60N 2002/022* (2013.01)

(58) Field of Classification Search
USPC ...... 297/284.1, 284.3, 284.9, 452.34, 452.36
See application file for complete search history.

(56) References Cited

U.S. PATENT DOCUMENTS

| | | |
|---|---|---|
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Bottcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |

(56) References Cited

U.S. PATENT DOCUMENTS

| | | |
|---|---|---|
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Lachat |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |

(56) References Cited

U.S. PATENT DOCUMENTS

| | | |
|---|---|---|
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 3,011,728 A1 | 9/2011 | Kohl et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |

(56) References Cited

U.S. PATENT DOCUMENTS

| | | |
|---|---|---|
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimborn et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurksi et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |

(56) References Cited

U.S. PATENT DOCUMENTS

| | | |
|---|---|---|
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |

(56) References Cited

FOREIGN PATENT DOCUMENTS

| KR | 20050110301 | A | 11/2005 |
|---|---|---|---|
| KR | 20080066428 | A | 7/2008 |
| KR | 20100019390 | A | 2/2010 |
| KR | 1020110051692 | A | 5/2011 |
| KR | 101180702 | B1 | 9/2012 |
| WO | WO9511818 | A1 | 5/1995 |
| WO | 9534449 | A1 | 12/1995 |
| WO | 9815435 | A1 | 4/1998 |
| WO | 9831992 | A1 | 7/1998 |
| WO | 9919708 | | 4/1999 |
| WO | WO9958022 | A1 | 11/1999 |
| WO | 0021797 | A1 | 4/2000 |
| WO | 0144026 | A1 | 6/2001 |
| WO | WO2006131189 | A1 | 12/2006 |
| WO | 2007009893 | A2 | 1/2007 |
| WO | WO2007028015 | A2 | 3/2007 |
| WO | 2008019981 | A1 | 2/2008 |
| WO | WO2008073285 | A1 | 6/2008 |
| WO | 2010096307 | A1 | 8/2010 |
| WO | WO2011021952 | A1 | 2/2011 |
| WO | 2011068684 | A1 | 6/2011 |
| WO | WO2012008904 | A1 | 1/2012 |
| WO | 2012138699 | A1 | 10/2012 |
| WO | 2013040085 | A2 | 3/2013 |
| WO | 2013070905 | A1 | 5/2013 |
| WO | 2013101644 | A1 | 7/2013 |
| WO | 2014047417 | A1 | 3/2014 |

OTHER PUBLICATIONS

Richard A Lowry, United States Patent and Trademark Office, Non Final Office Communication re U.S. Appl. No. 13/748,847, Sep. 10, 2014, 14 pages.
David E Allred, United States Patent and Trademark Office, Non Final Office Communication re U.S. Appl. No. 13/748,857, Aug. 25, 2014, 13 pages.
Timothy J Brindley, United States Patent and Trademark Office, Final Office Communication re U.S. Appl. No. 13/749,568, Mar. 26, 2015, 9 pages.
Timothy J Brindley, United States Patent and Trademark Office, Non Final Office Communication re U.S. Appl. No. 13/749,568, Sep. 8, 2014, 9 pages.
Milton Nelson Jr., United States Patent and Trademark Office, Final Office Communication re U.S. Appl. No. 13/749,572, Mar. 3, 2015, 13 pages.
Milton Nelson Jr., United States Patent and Trademark Office, Non Final Office Communication re U.S. Appl. No. 13/749,572, Sep. 30, 2014, 20 pages.
Nicole T Verley, United States Patent and Trademark Office, Non Final Office Communication re U.S. Appl. No. 13/749,589, Oct. 4, 2013, 12 pages.
Timothy J Brindley, United States Patent and Trademark Office, Non Final Office Communication re U.S. Appl. No. 13/749,595, Aug. 28, 2014, 10 pages.
Timothy J Brindley, United States Patent and Trademark Office, Final Office Communication re U.S. Appl. No. 13/749,595, Jan. 12, 2015, 10 pages.
Timothy J Brindley, United States Patent and Trademark Office, Non Final Office Communication re U.S. Appl. No. 13/749,584, Sep. 15, 2014, 9 pages.
Yolanda G Giacoman, United States Patent and Trademark Office, Final Office Communication re U.S. Appl. No. 13/748,862, Dec. 30, 2015, 10 pages.
Yolanda G Giacoman, United States Patent and Trademark Office, Non Final Office Communication re U.S. Appl. No. 13/748,862, Aug. 13, 2015, 9 pages.
Yolanda G Giacoman, United States Patent and Trademark Office, Final Office Communication re U.S. Appl. No. 13/748,862, Mar. 10, 2015, 19 pages.
Yolanda G Giacoman, United States Patent and Trademark Office, Non Final Office Communication re U.S. Appl. No. 13/748,862, Sep. 25, 2014, 16 pages.
Milton Nelson Jr., United States Patent and Trademark Office, Non Final Office Communication re U.S. Appl. No. 13/749,602, Sep. 19, 2014, 9 pages.
Melissa Ann Black, United States Patent and Trademark Office, Non Final Office Communication re U.S. Appl. No. 13/914,666, Mar. 13, 2015, 6 pages.
Philip F Gabler, United States Patent and Trademark Office, Non Final Office Communication re U.S. Appl. No. 14/025,483, Dec. 17, 2014, 8 pages.
Philip F Gabler, United States Patent and Trademark Office, Final Office Communication re U.S. Appl. No. 14/025,483, Apr. 23, 2015, 10 pages.
Philip F Gabler, United States Patent and Trademark Office, Non Final Office Communication re U.S. Appl. No. 14/025,483, Aug. 18, 2015, 14 pages.
Philip F Gabler, United States Patent and Trademark Office, Final Office Communication re U.S. Appl. No. 14/025,483, Dec. 18, 2015, 14 pages.
Peter R Brown, United States Patent and Trademark Office, Final Office Communication re U.S. Appl. No. 14/104,780, Dec. 1, 2015, 5 pages.
Peter R Brown, United States Patent and Trademark Office, Non Final Office Communication re U.S. Appl. No. 14/104,780, Jun. 29, 2015, 9 pages.
Nicole T Verley, United States Patent and Trademark Office, Advisory Action for U.S. Appl. No. 14/056,005, Sep. 30, 2015, 3 pages.
Nicole T Verley, United States Patent and Trademark Office, Final Office Communication re U.S. Appl. No. 14/056,005, Jun. 10, 2015, 8 pages.
Nicole T Verley, United States Patent and Trademark Office, Non Final Office Communication re U.S. Appl. No. 14/056,005, Mar. 2, 2015, 8 pages.
Peter R Brown, United States Patent and Trademark Office, Non Final Office Communication re U.S. Appl. No. 14/056,000, Mar. 4, 2015, 7 pages.
Peter R Brown, United States Patent and Trademark Office, Non Final Office Communication re U.S. Appl. No. 14/056,000, Oct. 1, 2014, 8 pages.
Philip F Gabler, United States Patent and Trademark Office, Final Office Communication re U.S. Appl. No. 14/076,893, Sep. 29, 2015, 13 pages.
Philip F Gabler, United States Patent and Trademark Office, Non Final Office Communication re U.S. Appl. No. 14/076,893, Apr. 21, 2015, 12 pages.
David E Allred, United States Patent and Trademark Office, Non Final Office Communication re U.S. Appl. No. 14/063,647, Aug. 18, 2015, 19 pages.
Matthew W Ing, United States Patent and Trademark Office, Non Final Office Communication re U.S. Appl. No. 14/609,092, Oct. 19, 2015, 11 pages.
Alexander Scott Harrison, United States Patent and Trademark Office, Final Office Communication re U.S. Appl. No. 14/243,027, Jan. 20, 2016, 17 pages.
Alexander Scott Harrison, United States Patent and Trademark Office, Non Final Office Communication re U.S. Appl. No. 14/243,027, Aug. 13, 2015, 15 pages.
Ryan D Kwiecinski, United States Patent and Trademark Office, Non Final Office Communication re U.S. Appl. No. 14/230,961, Dec. 24, 2015, 12 pages.
Philip F Gabler, United States Patent and Trademark Office, Final Office Communication re U.S. Appl. No. 14/257,655, Dec. 18, 2015, 10 pages.
Philip F Gabler, United States Patent and Trademark Office, Non Final Office Communication re U.S. Appl. No. 14/257,655, Aug. 20, 2015, 10 pages.
Syed A Islam, United States Patent and Trademark Office, Final Office Communication re U.S. Appl. No. 14/275,368, Nov. 13, 2015, 13 pages.

(56) References Cited

OTHER PUBLICATIONS

Syed A Islam, United States Patent and Trademark Office, Non Final Office Communication re U.S. Appl. No. 14/275,368, May 6, 2015, 10 pages.
Laurie K Cranmer, United States Patent and Trademark Office, Non Final Office Communication re U.S. Appl. No. 14/505,675, Aug. 31, 2015, 7 pages.
Rodney Barnett White, United States Patent and Trademark Office, Non Final Office Communication re U.S. Appl. No. 14/600,166, Nov. 2, 2015, 7 pages.
Rodney Barnett White, United States Patent and Trademark Office, Final Office Communication re U.S. Appl. No. 14/534,296, Dec. 11, 2105, 14 pages.
Rodney Barnett White, United States Patent and Trademark Office, Non Final Office Communication re U.S. Appl. No. 14/534,296, Aug. 26, 2015, 13 pages.
Sanjeev Malhotra, United States Patent and Trademark Office, Non Final Office Communication re U.S. Appl. No. 14/534,285, Sep. 23, 2015, 14 pages.
Nicole T Verley, United States Patent and Trademark Office, Non Final Office Communication re U.S. Appl. No. 14/635,025, Dec. 4, 2015, 8 pages.
M. Grujicic et al., "Seat-cushion and soft-tissue material modeling and a finite element investigation of the seating comfort for passenger-vehicle occupants," Materials and Design 30 (2009) 4273-4285.
"Thigh Support for Tall Drivers," http://cars.about.com/od/infiniti/ig/2009-Infiniti-G37-Coupe-pics/2008-G37-cpe-thigh-support.htm (1 page) [Accessed from the Internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/broseindiaautomotivesystems/products.html, Oct. 9, 2012 (12 pages).
eCOUSTICS.COM, "Cineak Motorized Articulating Headrest Preview," http://www.ecoustics.com/ah/reviews/furniture/accessories/cineak-motorized-headrest, Oct. 9, 2012 (3 pages).
"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "Go Seat," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, KIT P/N: SCSOOOOOC3, http://www.techwebasto.com/accessories_main/seat_accessories/g_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro GmbH & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
Lexus, "The all-new Lexus 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.

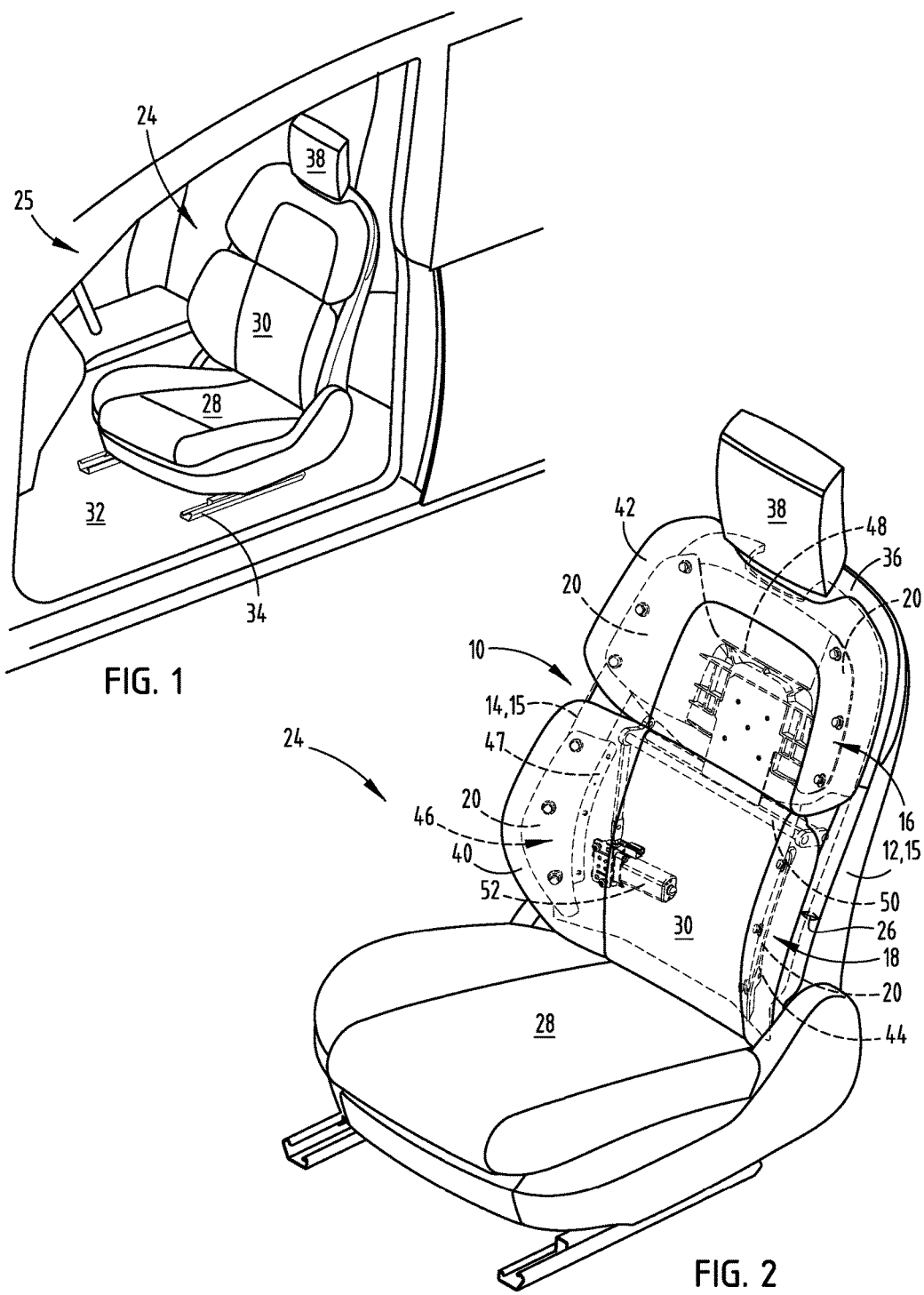

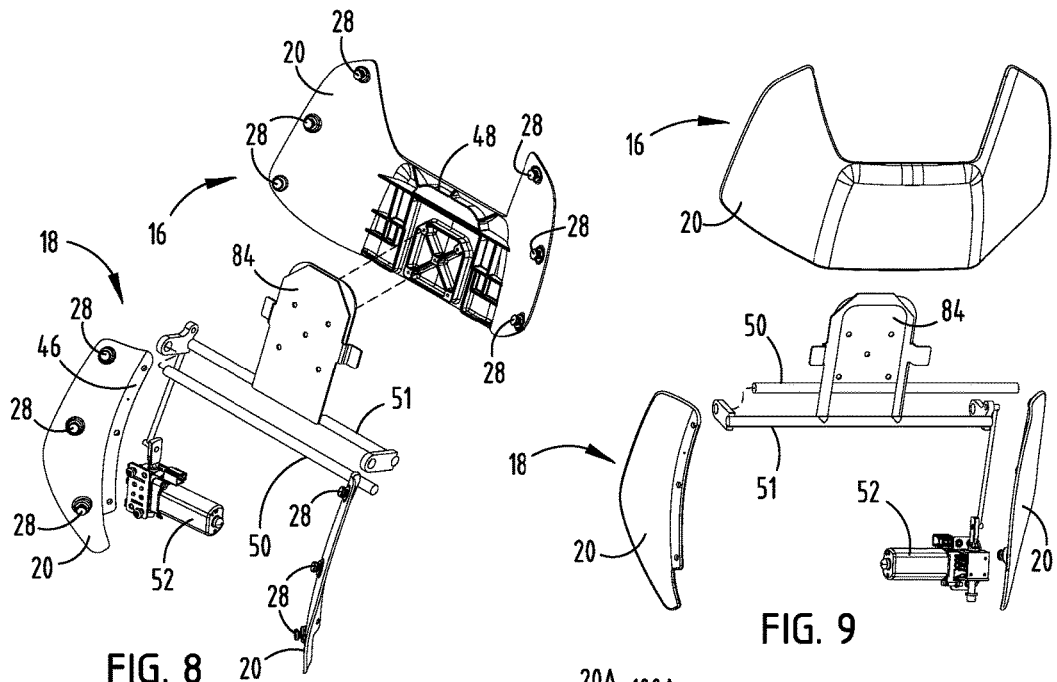
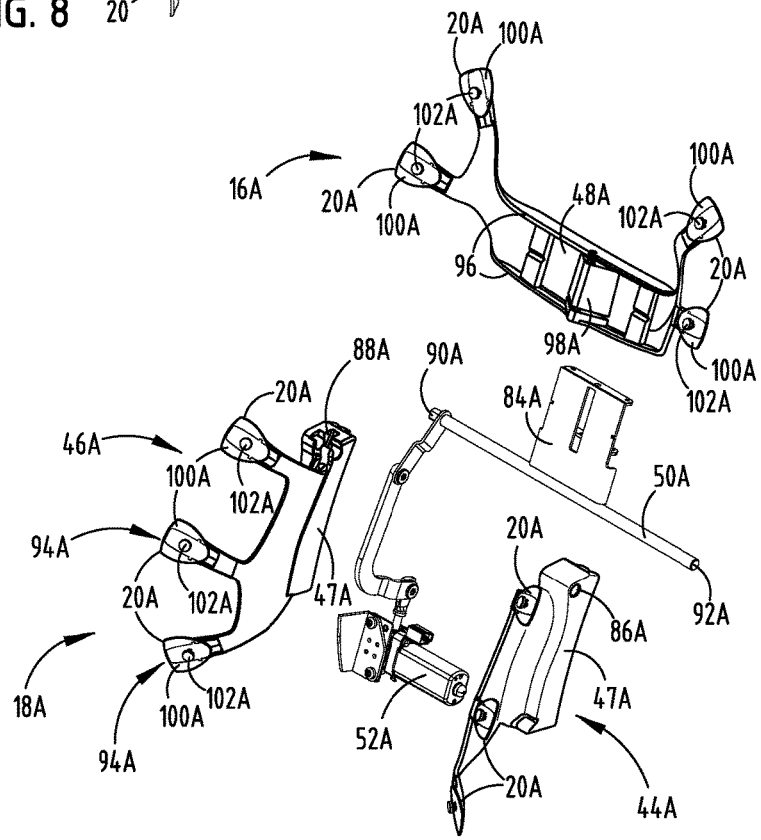

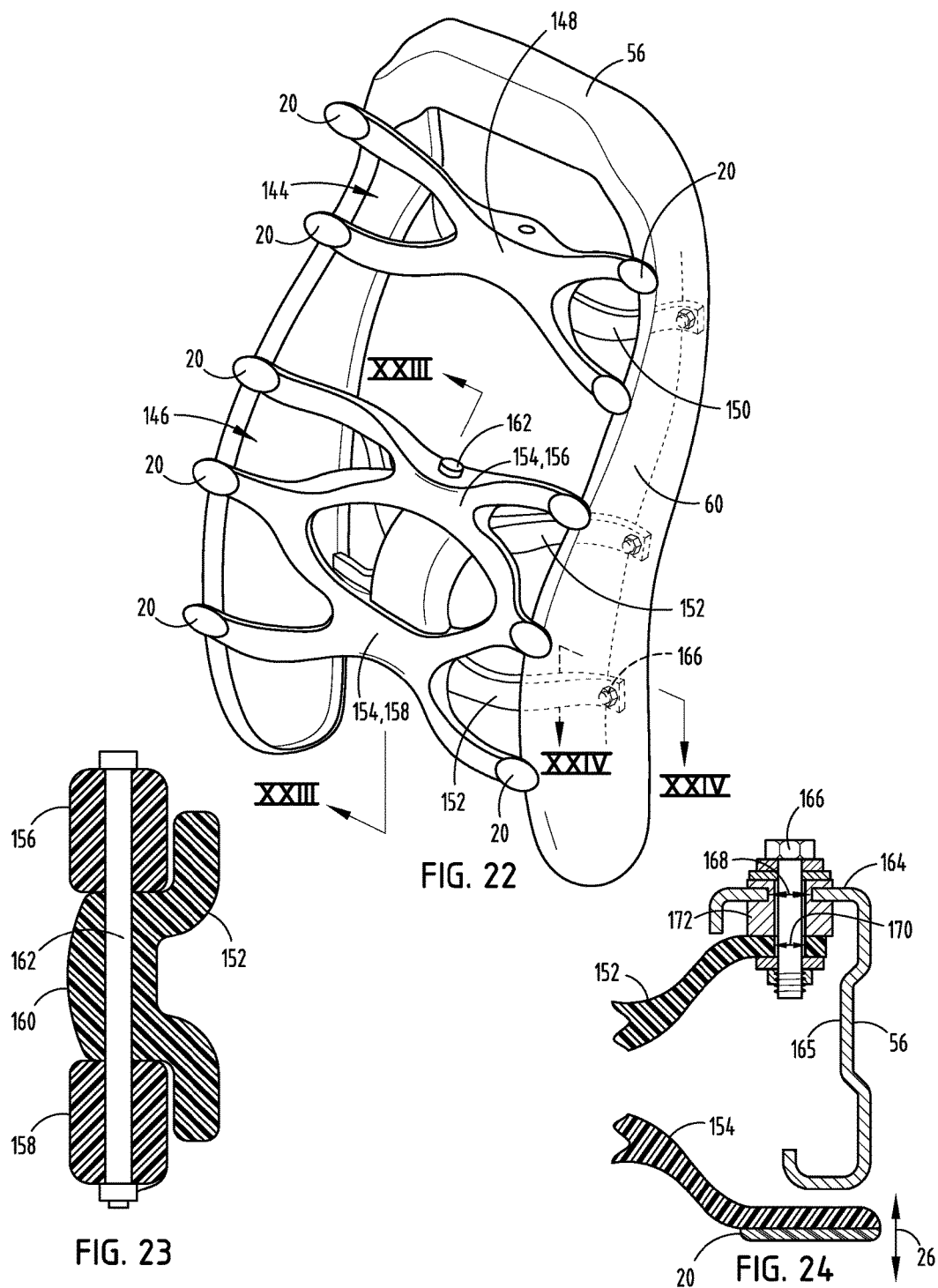

US 9,707,870 B2

FLEXIBLE SEATBACK SYSTEM

CROSS-REFERENCE TO RELATED APPLICATION

This application is a continuation of U.S. patent application Ser. No. 13/749,561 (now U.S. Pat. No. 9,409,504), filed on Jan. 24, 2013, entitled "FLEXIBLE SEATBACK SYSTEM," the entire disclosure of which is hereby incorporated herein by reference.

FIELD OF THE INVENTION

The present invention generally relates to a vehicle seat suspension system, and more particularly to a vehicle seating assembly with a flexible seatback suspension system.

BACKGROUND OF THE INVENTION

Vehicle seat assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE INVENTION

According to one aspect of the present invention, a vehicle seat suspension system includes first and second side supports defining a seatback structure. An upper component and a lower component are provided, each including at least two outwardly extending flex members. A passenger support includes a periphery operably coupled to distal ends of the flex members. An external peripheral gap is defined between the passenger support and the seatback structure.

According to another aspect of the present invention, a vehicle seat suspension system includes first and second side supports defining a seatback structure. An upper component and a lower component are provided, each including at least two outwardly extending flex members. A passenger support includes a periphery operably coupled to distal ends of the flex members. A removable cover stock is disposed over the upper and lower components. An external peripheral gap is defined between the passenger support and the first and second side supports.

According to yet another aspect of the present invention, a seat suspension system includes a seatback having first and second side supports. A suspension assembly includes outwardly extending flex members. A passenger support is operably coupled with the suspension assembly. An external peripheral gap is defined between the passenger support and the first and second side supports.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a vehicle seating assembly in a vehicle;

FIG. 2 is a top perspective view of the vehicle seating assembly having a vehicle seat suspension system;

FIG. 8 is an exploded front top perspective view of the suspension system shown in FIG. 5;

FIG. 8A is an exploded front top perspective view of the additional embodiment of the suspension system shown in FIG. 5A;

FIG. 9 is an exploded rear top perspective view of the suspension system shown in FIG. 5;

FIG. 22 is a top perspective view of an additional embodiment of a vehicle seating assembly;

FIG. 23 is a side elevational cross-sectional view of the suspension system taken at line XVII of FIG. 22;

FIG. 24 is a top plan cross-sectional view of the suspension system taken at line XVIII of FIG. 22.

DETAILED DESCRIPTION OF THE EMBODIMENTS

Figure 2A:
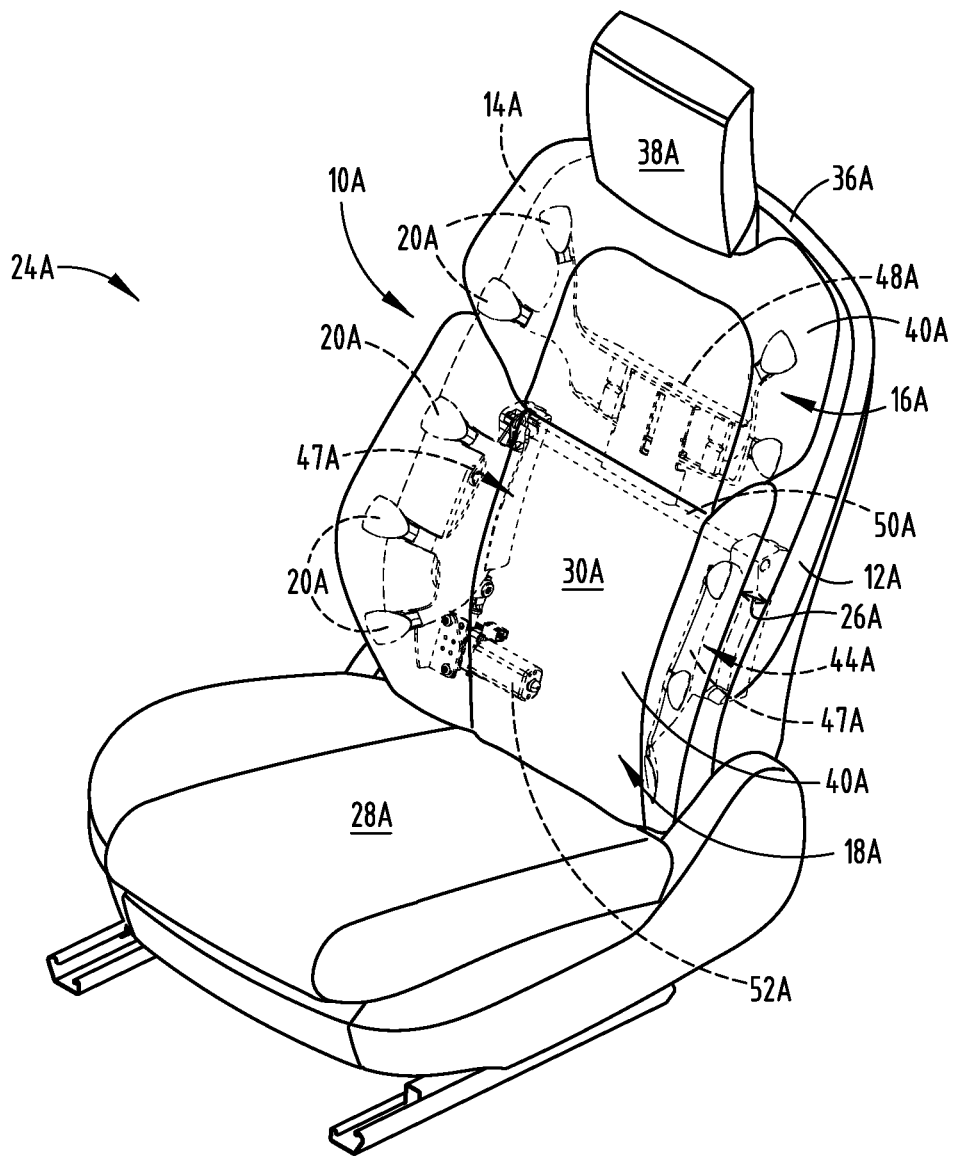
FIG. 2A is a top perspective view of an additional embodiment of the vehicle seating assembly and vehicle seat suspension system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-25, reference numeral 10 generally designates a vehicle seat suspension system that has a first side support 12 and a second side support 14 defining a seatback structure 15. An upper component 16 and a lower component 18 each include at least two outwardly extending flex members 20. A passenger support 22 includes a periphery 23 operably coupled to distal ends of the flex members 20. An external peripheral gap 26 is defined between the passenger support 22 and the seatback structure 15.

Referring now to FIG. 1, a vehicle seating assembly 24 is positioned in driver's side lactation of a vehicle 25. The vehicle seating assembly 24 includes a seat 28 pivotally coupled with a seatback 30. The seat 28 is slidably coupled with a floor 32 of the vehicle 25 about a track assembly 34. The track assembly 34 is configured to allow the vehicle seating assembly 24 to be adjusted in forward and rearward directions relative to the vehicle 25. It is understood that the vehicle seating assembly 24 may be positioned at various locations throughout the vehicle 25 other than the illustrated position, such as, a passenger side location, a mid-row location, and a rear seat location. It is also conceivable that the seat 28 may not include the track assembly 34 and alternatively may be fixedly coupled with the floor 32 of the vehicle 25.

As illustrated in FIG. 2, the vehicle seating assembly 24 contains the vehicle seat suspension system 10 of the present disclosure. As such, the seatback 30 of the seating assembly 24 includes the first side support 12 and the second side support 14 that define the seatback structure 15. The first and second side supports 12, 14 of the seatback structure 15 pivotally couple with a rear portion of the seat 28 and extend upward from the seat 28 to a top portion 36 of the seatback 30. The top portion 36 of the seatback 30 extends between the first and second side supports 12, 14. A head restraint 38 is coupled with the top portion 36 of the seatback 30 and is substantially centered between the first and second side supports 12, 14. The upper and lower components 16, 18 of the suspension system 10 are coupled with and span between the first and second side supports 12, 14, such that the suspension system 10 is positioned generally between the head restraint 38 and the seat 28 to support an occupant's back. It is contemplated that the head restraint 38 may be integrated with the top portion 36 of the seatback 30 or that the head restraint 38 may otherwise not be included on the vehicle seating assembly 24.

The lower component 18 of the suspension system 10, as shown in FIG. 2, includes a flex member 20 extending from each of the first side support 12 and the second side support 14 to engage a lower segment 40 of the passenger support 22. The lower segment 40 is positioned adjacent to the seat 28 and is configured to support a lower back of an occupant. Similarly, the upper component 16 of the suspension system 10 has a pair of flex members 20 extending to engage an upper segment 42 of the passenger support 22 proximate the first and second side supports 12, 14. The flex members 20 of the upper component 16 extend from a central body 48 that is pivotably coupled with the first and second side supports 12, 14. Accordingly, the upper and lower components 16, 18 each include at least two outwardly extending flex members 20. However, it is conceivable that the upper and lower components 16, 18 may be integrated in a single component spanning the seatback 30 or divided further into additional components along the seatback 30.

Still referring to FIG. 2, the lower component 18 also includes a first side portion 44 and a second side portion 46, such that the first side portion 44 is distinct and separate from the second side portion 46. The first side portion 44 and the second side portion 46 each include a base section 47 coupled with the first and second side supports 12, 14, respectively. The first and second side portions 44, 46 also include a flex member 20 that extends from the base section 47 to operably couple with the lower segment 40 of the passenger support 22. Accordingly, the first and second side portions 44, 46 of the lower component 18 are each independently coupled with the seatback structure 15 and independently extend to operably couple with the lower segment 40 of the passenger support 22.

The upper component 16 of the suspension system 10, as shown in FIG. 2, includes a pair of flex member 20 extending from both sides of the central body 48 to operably couple with the upper segment 42 of the passenger support 22. The upper segment 42 is positioned between the lower segment 40 of the passenger support 22 and the head restraint 38 to support an upper back of an occupant. The central body 48 of the upper component 16 is coupled with a pivot bar 50 that laterally extends between the first and second side supports 12, 14 of the seat structure 15. The pivot bar 50 is pivotally coupled to allow the upper component 16 to pivot forward and rearward about the pivot bar 50. Further, the pivot bar 50 is operably coupled with a motor 52 to adjustably rotate the pivot bar 50 and thereby pivot the upper component 16 forward and rearward relative to seat structure 15, as described in more detail below.

An additional embodiment of the vehicle seating assembly is illustrated in FIG. 2A and other figures denoted with an "A" suffix, illustrating similar components with like reference numerals that also include an "A" suffix. As shown in FIG. 2A, a lower component 18A of the vehicle suspension system 10A includes three flex members 20A extending from the first side support 12A, and three flex members 20A extending from the second side support 14A. These flex members 20A have a finger shape that similarly engage the lower segment 40A of the passenger support 22A. The base sections 47A of the first and second side portions 44A, 46A spans along the first and second side supports 12A, 14A, respectively to interconnect the finger shaped flex members 20A. This additional embodiment also includes an upper component 16A having two, finger shaped flex members 20A extending from both sides of a central body 48A to operably couple to an upper segment 42A of the passenger support 20A, proximate the first and second side supports 12A, 14A. In addition the upper and lower segments 42A, 40A of the passenger support 22A include alternative shapes from those disclosed in FIG. 2, to similarly support the upper and lower back of an occupant. It is further contemplated that an alternative embodiment may include more, fewer, or alternatively shaped flex members extending on either side of an upper component and a lower component to engage a passenger support.

Figure 3:
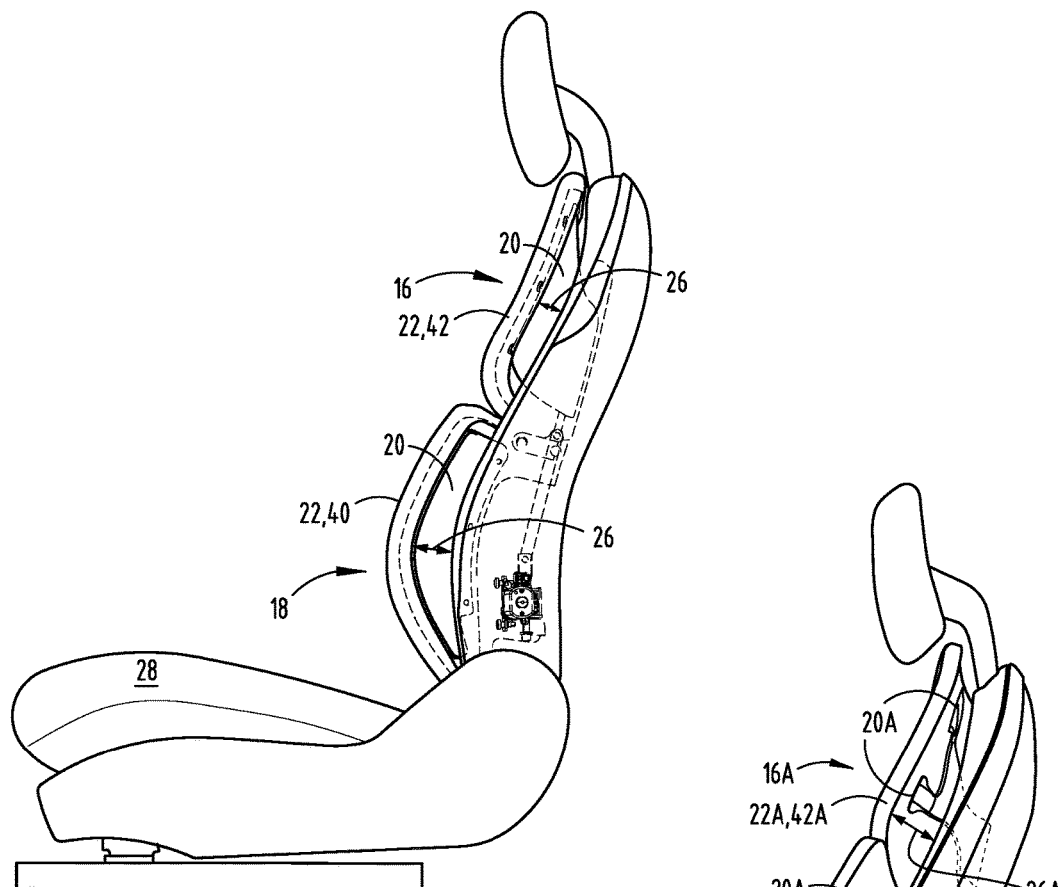
FIG. 3 is a side elevational view of the vehicle seating assembly shown in FIG. 2.
Figure 3A:
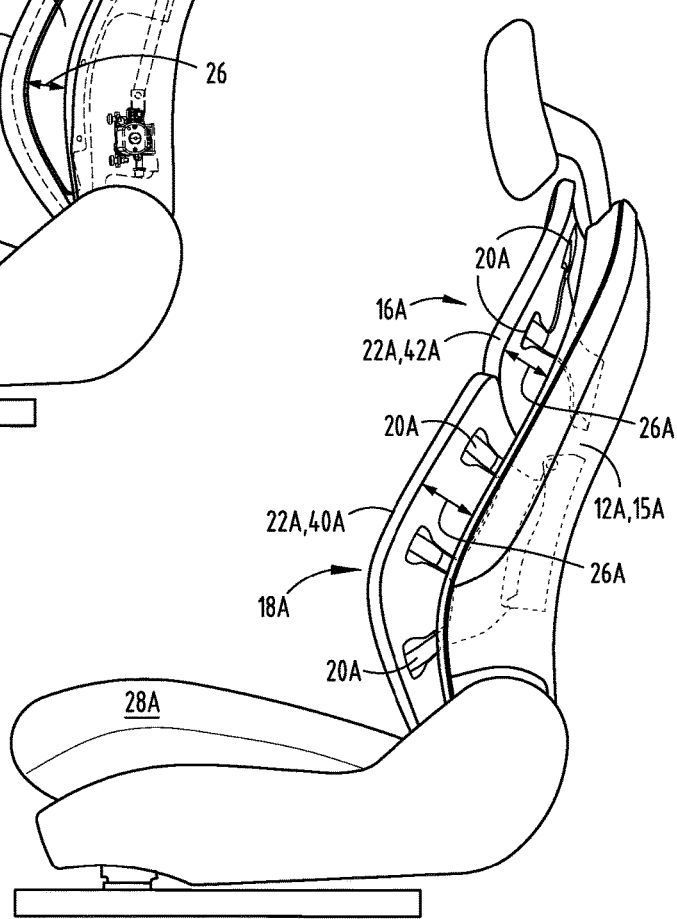
FIG. 3A is a side elevational view of the additional embodiment of the vehicle seating assembly shown in FIG. 2A.
Figure 4:
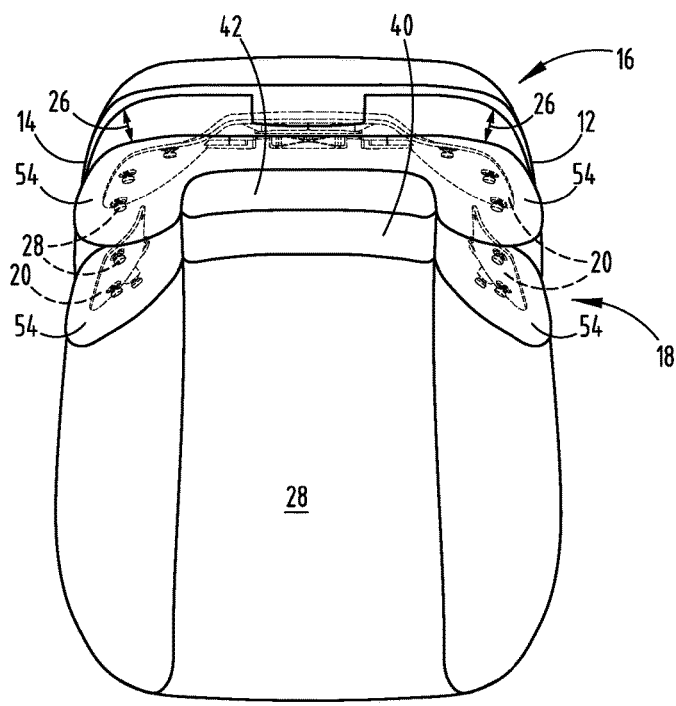
FIG. 4 is a top plan view of the vehicle seating assembly shown in FIG. 2.

As illustrated in FIGS. 3-4, the flex members 20 of the upper and lower components 16, 18 extend forward from the seatback structure 15 to form the external peripheral gap 26 between the seatback structure 15 and the passenger support 22. The external peripheral gap 26 may be reduced in size proximate a force acting on the passenger support 22, compressing one or more flex members 20 supporting the passenger support 22. As such, the upper component 16 and the lower component 18 are independently flexible under the weight of an occupant, as described in more detail below. As shown in FIG. 4, the flex members 20 of the upper and lower components 16, 18 also extend forward and laterally outward to operably couple with angled side bolsters 54 of the passenger support 22. The angled side bolsters 54 are configured to prevent lateral movement of a back of an occupant relative to the passenger support 22, such as lateral movement of an occupant's back when experiencing a centrifugal force from turning the vehicle 25.

Figure 4A:
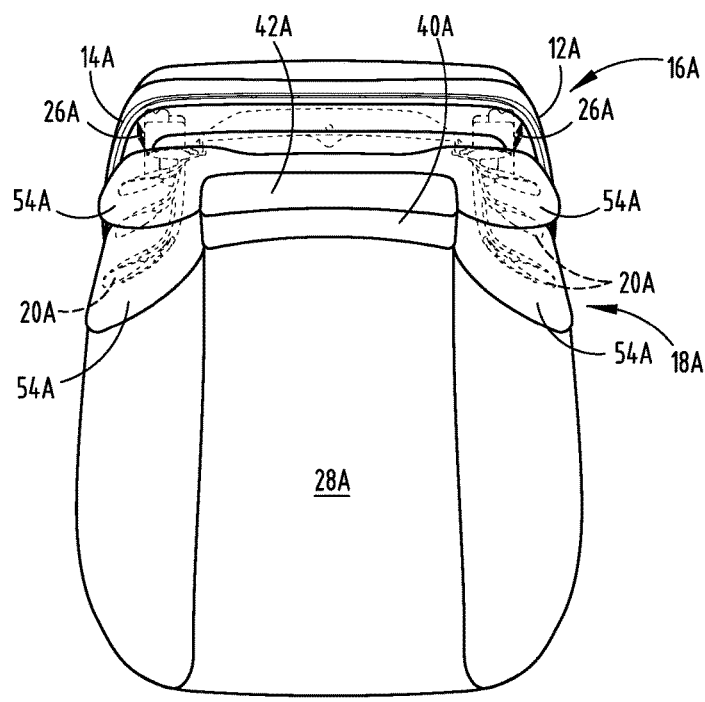
FIG. 4A is a top plan view of the additional embodiment of the vehicle seating assembly shown in FIG. 2A.

Further, as shown in FIGS. 3A-4A, the additional embodiment of the seating assembly 24A has alternatively configured flex members 20A that similarly form an external peripheral gap 26A between the passenger support 22A and the seatback structure 15A. Also, the additional embodiment, as illustrated in FIG. 4A, includes angled side bolsters 54A of the passenger support 22A. However, it is conceivable that the seatback 30A may be configured without angled side bolsters 54A. It is also contemplated that the external peripheral gap 26A may be concealed by a cover stock material, a flexible shroud, or other conceivable barriers to visually conceal and/or to conceal from insertion of objects.

Figure 5:
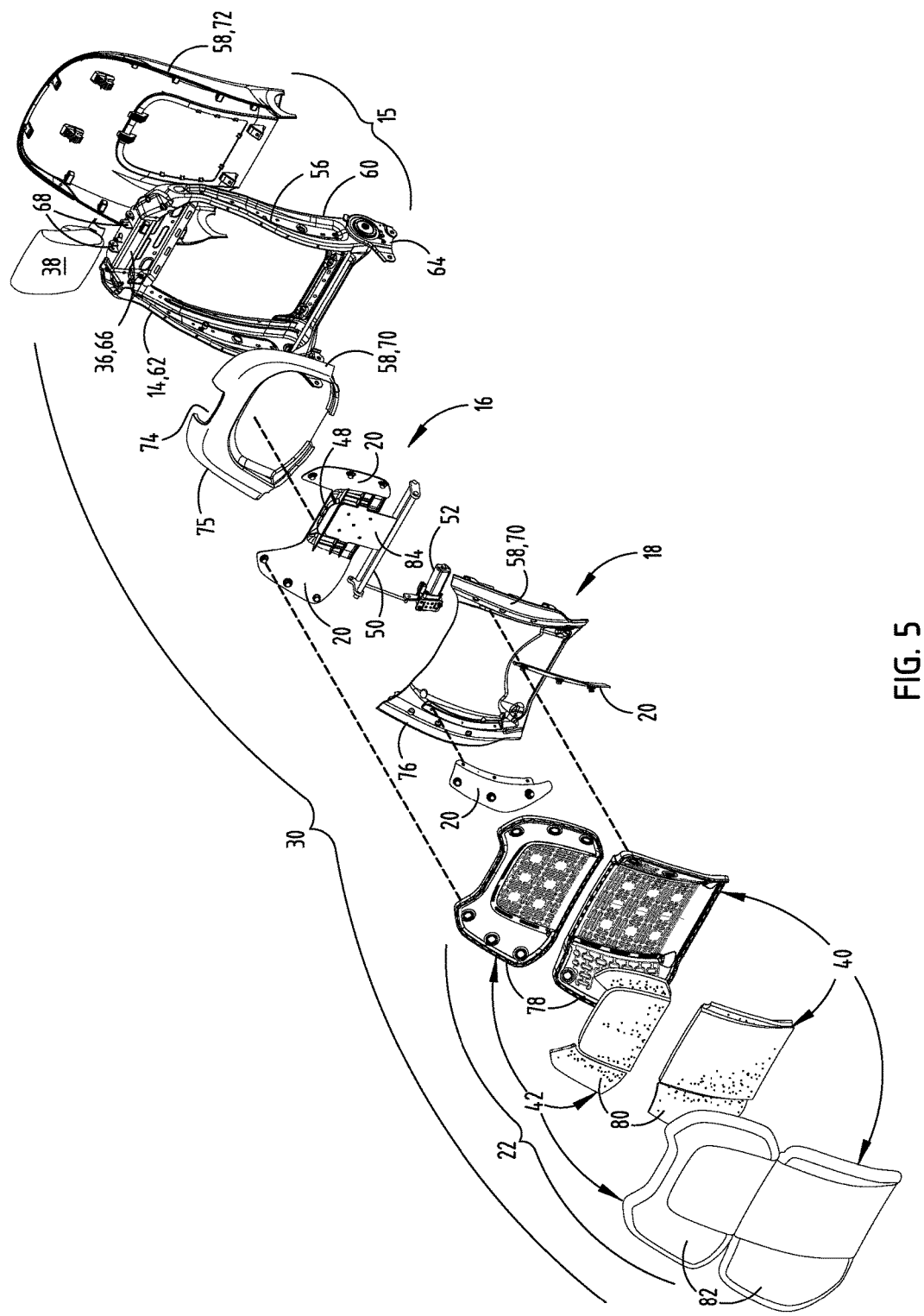
FIG. 5 is an exploded top perspective view of a seatback of the vehicle seating assembly shown in FIG. 2, having the suspension system and a passenger support.

The seatback structure 15, as shown in FIG. 5, includes a metal frame 56 and a plastic trim shell 58 configured to substantially enclose the metal frame 56. The metal frame 56 has a first side member 60 and a second side member 62 extending upward from a recliner bracket 64 that pivotally couples with the seat 28 (FIG. 2). The first and second side members 60, 62 are substantially parallel with each other and curve upward and rearward from the recliner bracket 64 to provide a curved shape that is substantially similar to an occupant's spinal column. Further, the side members 60, 62 are more robust proximate the recliner bracket 64 and taper as they extend upward to couple with a top member 66 that extends orthogonally between the first and second side members 60, 62. Accordingly, the first and second side supports 12, 14 of the seatback structure 15 include the first and second side members 60, 62, respectively, and the top portion 36 of the seatback structure 15 includes the top member 66 of the metal frame 56. The top member 66 includes connectors 68 for securing the head restraint 38 at a central portion of the top member 66 centrally between the first and second side members 60, 62. The connectors 68 include upward protruding tabs configured to couple with the head restraint 38.

As also shown in FIG. 5, plastic trim shell 58 includes a back trim panel 72 and a front trim panel 74. The back trim panel 72 couples with the metal frame 56 to substantially enclose the rear portion of the seat structure 15. Similarly, the front trim panel 74 has an upper piece 75 and a lower piece 76 that each couple with the metal frame 56 to enclose the front portion of the seat structure 15. The lower piece 76 of the front trim panel 70 couples with the flex members 20 of the lower component 18, and as such, supports the lower segment 40 of the passenger support 22. The upper piece 75 of the front trim panel 70 couples with the lower piece 76 at a central area of the seatback 30. The upper pieces 75 also includes a mounting cutaway 74 for receiving the head restraint 38 that extends there through to couple with the top member 66 of the metal frame 56. Further, the upper component 16 is positioned forward the upper piece, as explained in more detail below. The front trim panel 70 and the back trim panel 72 also engage the metal frame 56 proximate the top member 66, the first side member 60, and the second side member 62, substantially enclosing the edge portion of the metal frame 56. The shell 58 is typically molded with a polymer material and the frame 56 is constructed substantially of steel, aluminum, or another substantially rigid metal. It is conceivable that alternative materials or forming methods may be used for the shell 58 and the frame 56. In addition, the shell 58, or portions thereof, may conceivably be integrated with the frame 56.

Still referring to FIG. 5, the upper and lower components 16, 18 of the suspension system 10 are configured to operably couple with the passenger support 22. More specifically, the flex members 20 on the upper and lower components 16, 18 extend forward to engage the upper and lower segments 42, 40 of the passenger support 22. The upper and lower segments 42, 40 include a trim carrier 78, a cushion 80, and a cover stock 82. The flex members 20 operably couple to the trim carrier 78 in a snap-fit and friction-fit arrangement. The cushion 80 is disposed between the trim carrier 78 and the cover stock 82, as described in more detail below. It is conceivable that the passenger support 22 may include more or fewer layers between the cover stock 82 and the trim carrier 78. Further, it is conceivable that the upper and lower segments 42, 40 of the passenger support 22 may be an integral piece with each other and/or with the upper and lower components 16, 18 of the suspension system 10

Figure 5A:
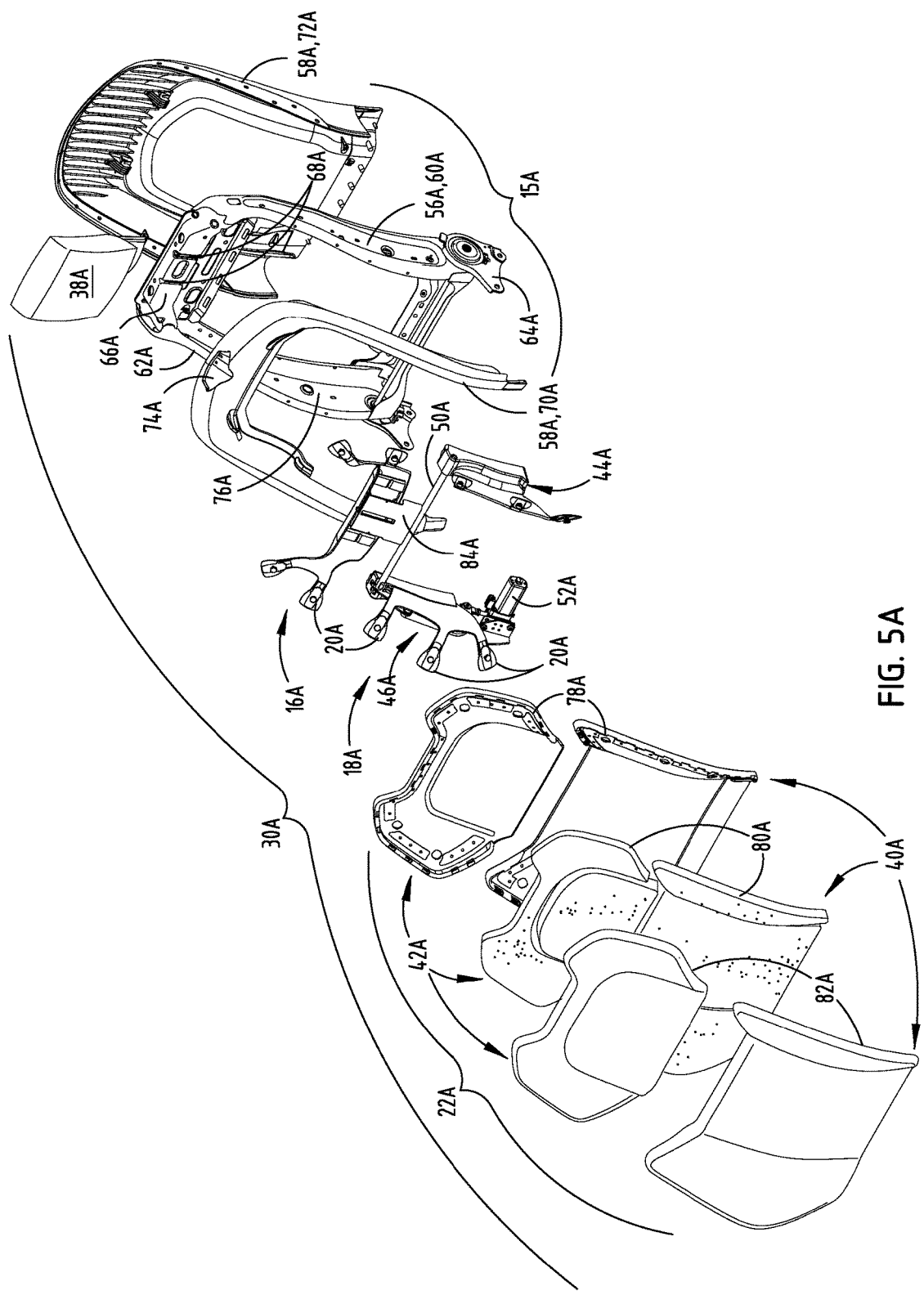
FIG. 5A is an exploded top perspective view of a seatback the additional embodiment of the vehicle seating assembly shown in FIG. 2A, having the suspension system a passenger support.

In the additional embodiment illustrated in FIG. 5A, the front trim panel 70A is comprised of one piece having an inverted U-shape that does not include a portion spanning between a central portion of the first and second side members 60A, 62A of the metal frame 56A. Accordingly, in the embodiment shown in FIG. 5A, flex members 20A of the lower component 18A extend around the front trim panel 70A to directly coupled with the first and second side members 60A, 62A of the metal frame 56A. In addition, the connectors 68A that are configured to couple with the head restraint 38A include fastener apertures. It is conceivable that a variety of connectors 68A may be used to couple the head restraint 38A with the seatback 30A.

Figures 6, 7:
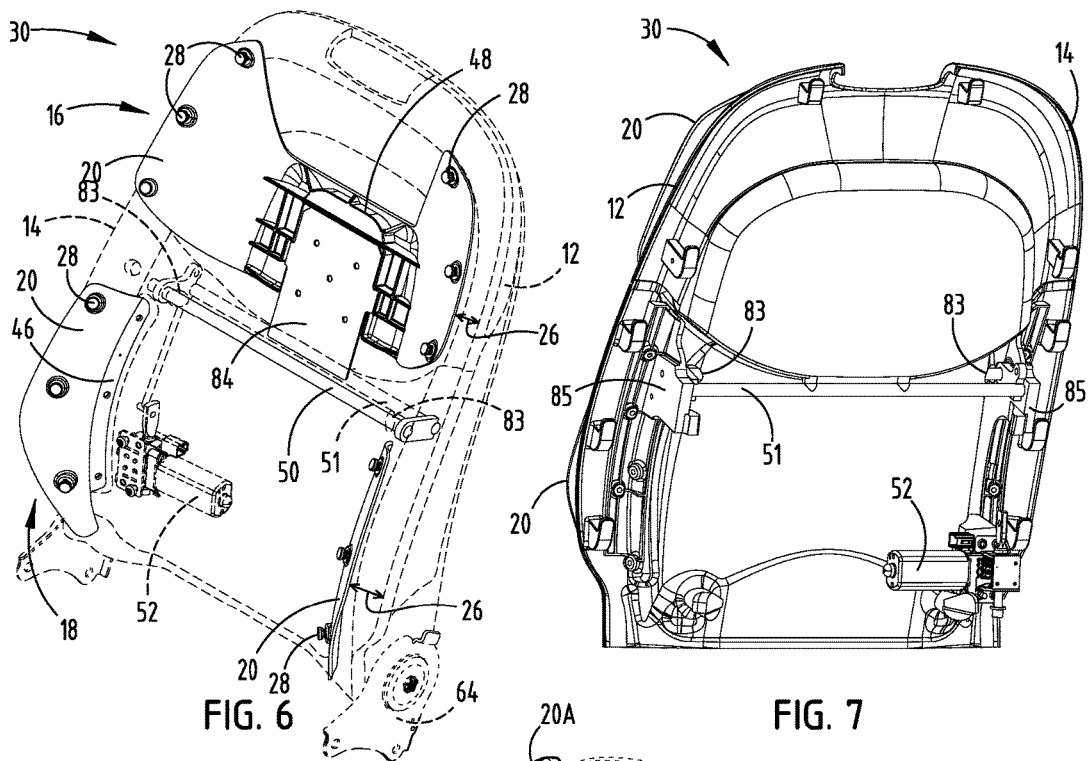
FIG. 6 is a front top perspective view of the seatback and the suspension system shown in FIG. 5.
FIG. 7 is a rear top perspective view of the seatback and the suspension system shown in FIG. 5.
Figure 6A:
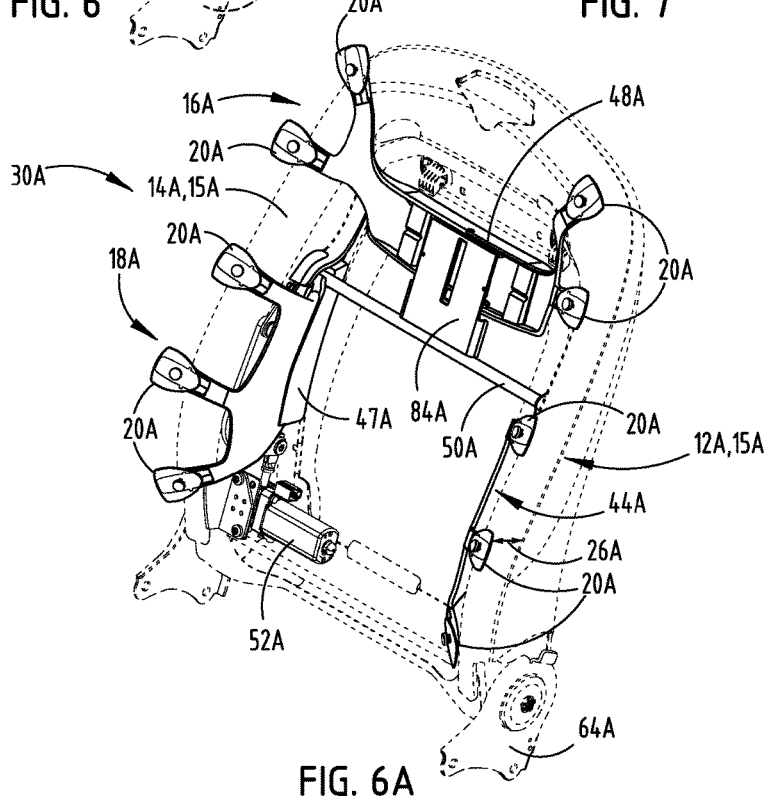
FIG. 6A is a front top perspective view of the additional embodiment of the seatback shown in FIG. 5A.

Referring now to FIGS. 6-7, the first and second side portions 44, 46, of the lower component 18 each include a flex member 20 that extends from the elongated base portion 47. The elongated base portions 47 each include three apertures arranged longitudinally and in alignment with the first and second side supports 12, 14 for fastening the first and second side portions 44, 46 of the lower component 18 to the lower piece 76 of the front trim panel 70. The flex members 20 of the lower component 18 extend forward and outward from the base portions 47 to create the external peripheral gap 26. The pivot bar 50 spans between and pivotally couples with the first and second side supports 12, 14, generally above the lower component 18. More specifically, the pivot bar 50 extends through holes 83 in the lower piece 76 of the front trim panel 70 to rotatably couple with a rearward protruding bracket 85 from the front trim panel 70. A support bar 51 extends in substantially parallel alignment rearward the pivot bar 50 and couples with the end portions of the pivot bar 50. The pivot bar 50 is operably coupled with the motor 52 to pivotally adjust the pivot bar 50, which also rotates the support bar 51. An extension bracket 84 fixedly couples and protrudes upward from an intermediate portion of the support bar 51 to a location forward the upper piece 75 of the front trim panel 70. The extension bracket 84 supports the upper component 16 of the suspension system 10. As such, pivotally adjusting the pivot bar 50 in turn adjusts the upper component 16 forward and rearward to support the upper back of an occupant.

In the additional embodiment shown in FIG. 7A, the elongated base portions 47A of the lower component 18A directly engage an interior face of the first and second side members 60A, 62A of the metal frame 56A. The flex members 20A similarly extend forward and curve outward from base portions 47A to create the peripheral gap 26A. In this embodiment, the pivot bar 50 rotatably couples with and extends between the base portions 47A. An extension bracket 84A fixedly couples and protrudes upward from an intermediate portion of the pivot bar 50A to support and pivotally adjust the upper component 16A of the suspension system 10. It is conceivable that the upper component 16A may be coupled with the first and second side supports 12A, 14A, of the seatback structure 15A without a pivot bar 50A or other pivoting connection.

As illustrated in FIGS. 8-9, the extension bracket 84 couples with the central body 48 of the upper component 16. The central body 48 of the upper component 16 is substantially rectangular shaped and includes structural flanges 96 between the extension bracket 84 and the flex members 20 to provide structural support to central body 48. The flex members 20 on the upper component 16 fan upward and outward from structural flanges 96 of the central body 48 to provide support to the upper back and shoulders of an occupant, such that weight of an occupant against the upper segment 42 of the passenger support 22 (FIG. 5) causes the flex members 20 to bend rearward proximate the occupants applied weight. However, the structural flanges 96 and other portion of the central body 48 are substantially rigid relative to the flex members 20, such that the bending movement is directed proximate the flex members 20.

The additional embodiment, as illustrated in FIG. 8A, includes a fulcrum 98A disposed at the middle portion of the central body 48A of the upper component 16A and extends between structural flanges 96A disposed on a top edge and a bottom edge of the central body 48. The fulcrum 98A is adapted to engage the extension bracket 84A that protrudes upward from the pivot bar 50A to allow the central body 48A to pivot laterally about the fulcrum 98A. Accordingly, in addition to the rearward bending movement of the flex members 20A of the upper component 16A under the weight of an occupant, the upper component 16A also pivots laterally about the fulcrum 98 to accommodate movement of an occupant's upper back and shoulders. Further, the additional embodiment includes a keyed end 90A on the pivot bar 50A to engage a slot 88A in the base portion 47A of the lower component 18A. The pivot bar 50A also has a circular end 92A to engage a rotation aperture 86A in the base portion 47A of the opposing side of the lower component 18A. The keyed end 90A of the pivot bar 50A allows the pivot bar 50A to be installed after the first and second side portions 44A, 46A are coupled with the metal frame 56A. In such an additional embodiment, the elongated base portions 47A have a substantially rectangular prism shape.

As also shown on the embodiment illustrated in FIG. 8A, the flex members 20A have distal ends 94A that each include a paddle portion 100A to engage the passenger support 22 (FIG. 5A). The paddle portions 100A have a protrusion 102A to engage the passenger support 22A in a snap-fit arrangement. As such, the flex members 20A of this embodiment are configured to bend between the paddle portions 100A and the base portions 47A, allowing the flex members 20A to elastically deform under the weight of an occupant. It is conceivable that the flex members 20A may be alternatively shaped to provide greater or less rigidity to the passenger support 22A. In addition, it is contemplated that the finger portions of the flex members 20A may be individually detachable from the base portion 47A of the lower component 18A or the central body 48A of the upper component 16A to allow for replacement and/or customized rigidity to the passenger support 22A proximate the detachable finger portion.

Figure 10:
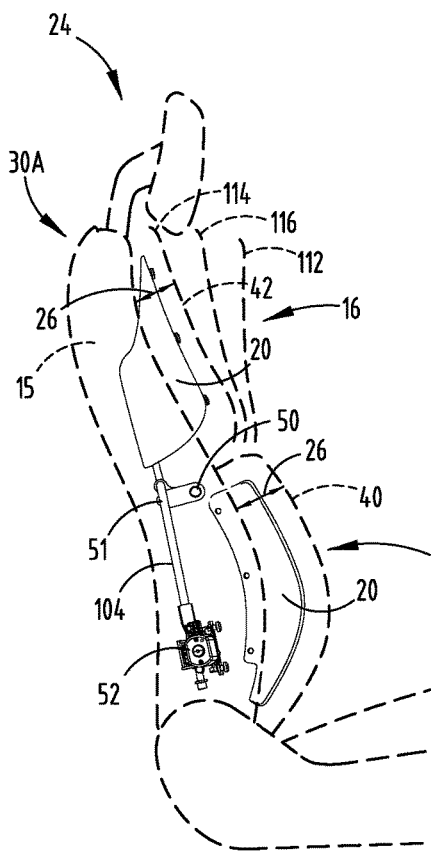
FIG. 10 is a side elevational view of the suspension system shown in FIG. 5, showing an outline of the vehicle seating assembly in dashed lines.

As illustrated in FIG. 10, the upper component 16 is pivotable forward and rearward about the pivot bar 50. The motor 52 is operably coupled with the pivot bar 50 to rotatably adjust support bar 51 and the upper segment 42 of the passenger support 22 forward and rearward relative to the lower segment 40. A linkage 104 couples the motor 52 with an end portion of the pivot bar 50. The linkage 104 may conceivably include a direct gear connection between motor 52 and the pivot bar 50. The upper component 16 is pivotal between a forward position 112, a rearward position 114, and various intermediate positions 116 there between. The upper component 16 in the rearward position 114 is defined by the upper segment 42 of the passenger support 22 substantially aligned with the seatback structure 15, as also shown in FIGS. 1-4. As the upper component 16 moves to the intermediate positions 116 and further to the forward position 112, the upper segment 42 of the passenger support 22 tilts forward to provide additional support to the upper back of an occupant. Accordingly, the external peripheral gap 26 expands proximate the upper component 16 as the upper segment 42 of the passenger support 22 pivots forward to the forward position 112. It is contemplated that the seating assembly 24 may be configured to optionally pivot the upper component 16 from the rearward position 114 to the intermediate positions 116 and further to forward position 112 simultaneously as the seatback 30 reclines from an upright position, as illustrated in FIG. 10, to a reclined position relative to the seat 28, as generally understood in the art.

Figure 10A:
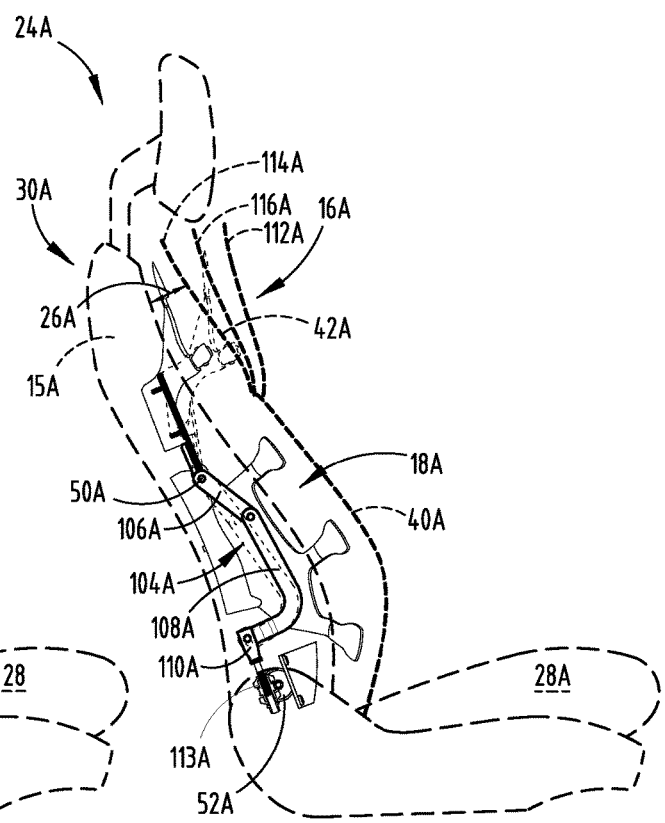
FIG. 10A is a side elevational view of the additional embodiment of the suspension system shown in FIG. 5A, showing an outline of the vehicle seating assembly in dashed lines.

As shown in FIG. 10A, the additional embodiment includes linkage assembly 104A coupling the keyed end 90A of the pivot bar 50A with the motor 52A to allow the upper segment 40A of the passenger support 22A to pivot about the pivot bar 50A. Such a linkage assembly 104A includes a top link 106A that is fixedly coupled with the pivot bar 50A and that extends down and forward from the pivot bar 50A. An L-shaped bottom link 108A pivotally couples with the top link 106A at an upper end of the bottom link 108A and pivotably couples with a pin 110A at a lower end of the bottom link 108A. The pin 110A is threaded to engage a worm gear 113A operably coupled with the motor 52A. The motor 52A operates to drive the pin 110A up or down based upon the rotational direction of the motor 52A. It is conceivable that the motor 52A may be replaced with a manually rotatable knob to cause the upper component 16A to pivot about the pivot bar 50A. Further, it is conceivable that various linkage alternative arrangements or other means, such as a Bowden cable, may be used to rotate the pivot bar 50A and pivot the upper component 16A.

Figure 11:
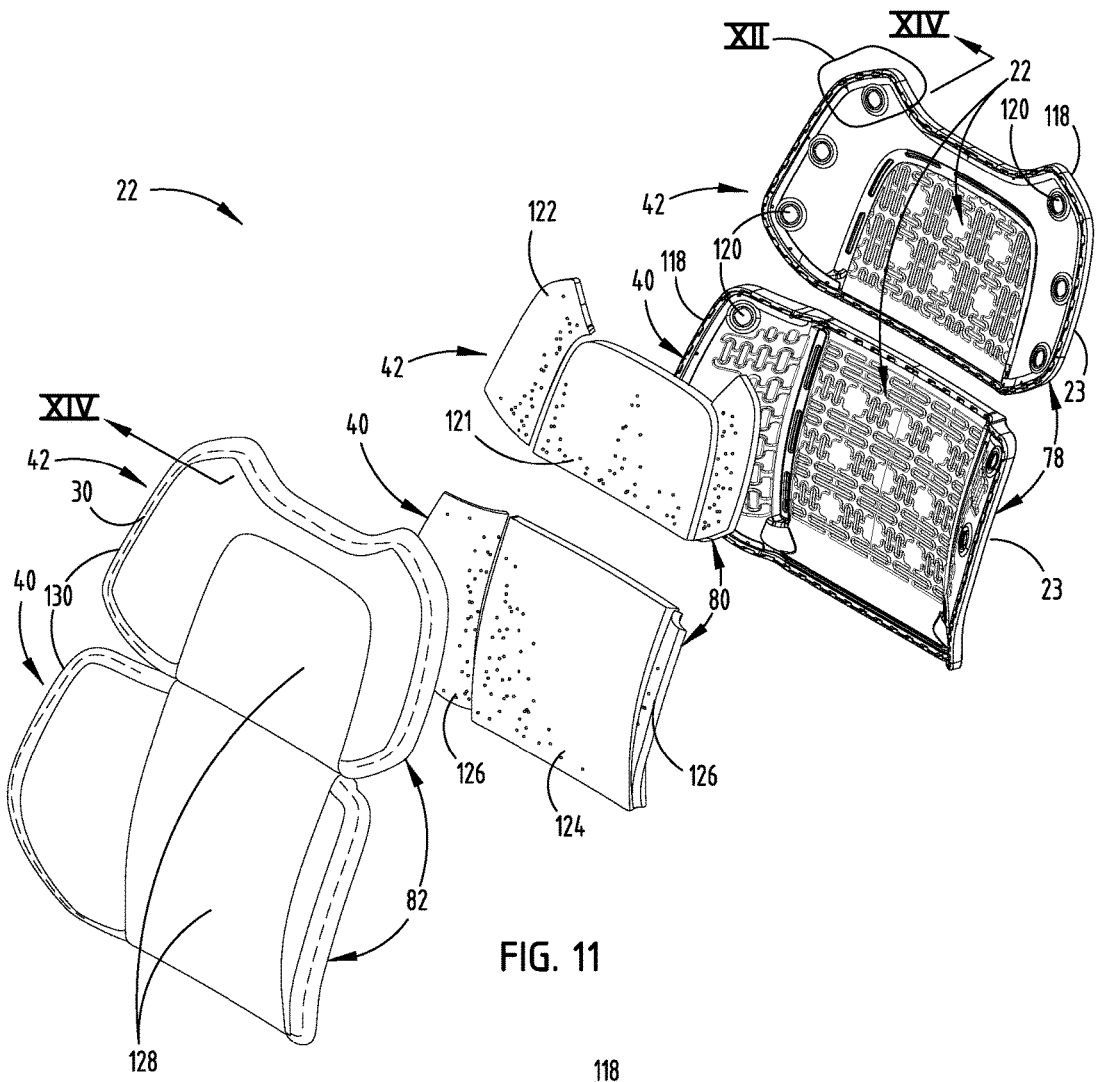
FIG. 11 is an exploded top perspective view of the passenger support shown in FIG. 5.
Figure 12:
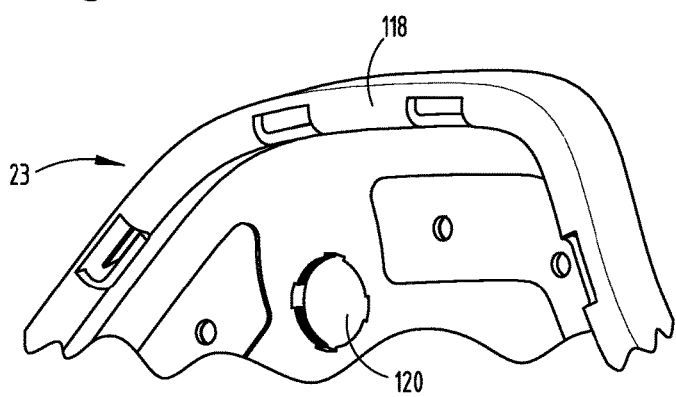
FIG. 12 is a enlarged cutaway view of a periphery of the passenger support taken at line XII of FIG. 11.

Referring to FIG. 11, the upper and lower segments 42, 40 of the passenger support 22 include the trim carrier 78, the cushion 80, and the cover stock 82. The trim carrier 78 has a substantially polymer-based structure that is formed to the contour of an occupant's back and is flexible to elastically deform somewhat under the weight of an occupant in conjunction with other portions of the suspension system 10, as provided in more detail below. Further, the passenger support 22 has the periphery 23 that operably couples to the flex members 20. More specifically, the periphery 23 of trim carrier 78 of the passenger support 22, as shown in FIG. 12, includes an outer edge 118 and a plurality of connection holes 120. The plurality of connection holes 120 are positioned to engage the protrusions 102 on the flex members 20 (FIG. 8) in a snap-fit arrangement. The trim carrier 78 is shown having two substantially solid molded plastic panels, one for each of the upper and lower segments 42, 40 of the passenger support. However, it is conceivable that the upper and lower segments 42, 40 may be a single piece with a living hinge disposed there between to allow for pivotal movement of the upper component 16. The trim carrier 78 also includes openings formed in a shape and pattern to increase the flexibility and ventilation of the passenger support 22. It is conceivable that the openings may be formed in an alternative pattern and/or a series of ventilations holes dispersed uniformly or intermittently over portions of the trim carrier 78 for the desired flexibility and ventilation of the passenger support 22.

The cushion 80 of the upper segment 42 of the passenger support, as shown in FIG. 11, has an inner portion 121 and two outer portions 122 laterally positioned on the sides of the inner portion 121 proximate the flex members 20 of the upper component 16 (FIG. 5). The inner and outer portions 121, 122 are disposed over the trim carrier 80 of the upper segment 43. Similarly, the cushion 80 of the lower segment 40 has a central portion 124 and two side portions 126 that are positioned laterally adjacent the central portion 124 and engage the trim carrier 78 of the lower segment 40. The outer edge 118 of the trim carrier 78, as shown in FIG. 12, protrudes forward from an engagement surface that has the plurality of connection holes 120 and that engages the cushion 80. The outer edge 118 laterally retains the outer portions 122 and the side portions 126 of the cushion 80. The outer portions 122 and the side portions 126 of the cushion 80 engage portions of the trim carrier 78 that flair forward to create the angled side bolsters 54 (FIG. 4), as described above. The cushion 80 includes a matrix of woven fibers that have open areas to allow ventilation. However, it is also conceivable that the cushion 80 may include various alternative flexible and breathable materials, such as polyurethane foam or other conceivable materials.

Figure 13:
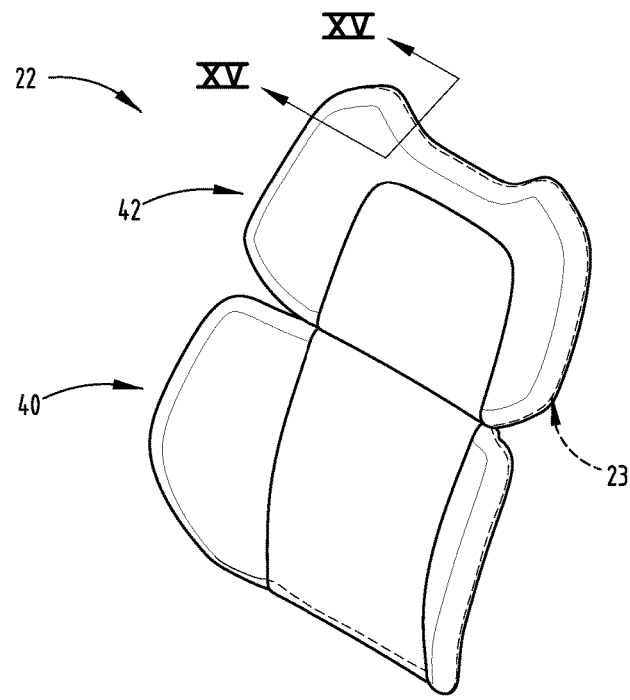
FIG. 13 is a top perspective view of the passenger support shown in FIG. 11.
Figure 14:
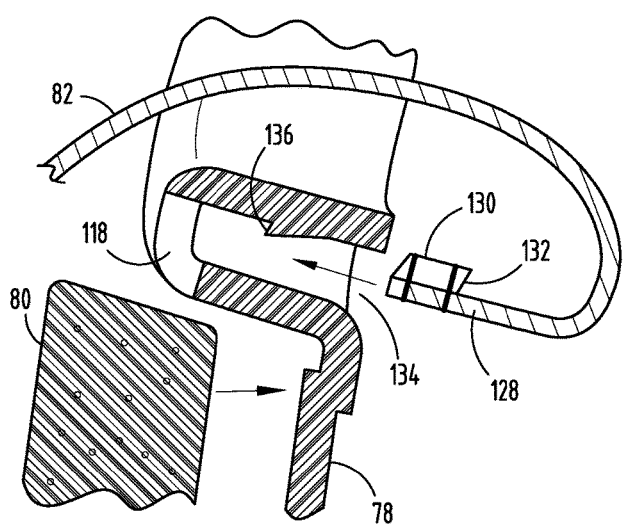
FIG. 14 is a cross-sectional side view of the passenger support taken at line XIV-XIV of FIG. 11, showing the flexible trim being attached to the trim carrier.
Figure 15:
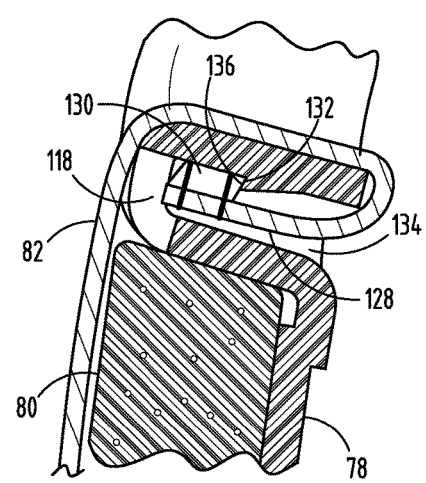
FIG. 15 is a cross-sectional side view of the passenger support taken at line XV-XV of FIG. 13, showing the flexible trim attached to the trim carrier.

As illustrated in FIGS. 13-15, the cover stock 82 of the passenger support 22 includes a securing rim 130 disposed on an edge portion 128 of the cover stock 82 that secures the cover stock 82 to the passenger support 22. The cover stock 82 covers the cushion 78 and wraps around the outer edge 118 of the trim carrier 78 to engage a groove 134 formed in the rear side of the exterior edge 118, as shown in FIG. 14. More specifically, the securing rim 130 includes a retention surface 132 that is configured to engage a lip 136 formed within the groove 134. The retention surface is substantially orthogonal to the cover stock 82 and the lip 136 is, similarly, orthogonal to the groove 134. Accordingly, upon insertion of the securing rim 130 of the cover stock 82 into the groove 134, as shown in FIG. 15, the securing rim 130 slides over the lip 136 and the retention edge 136 of the securing rim engages the lip 136, engaging the cover stock 82 with the trim carrier 78. The cover stock 82 also holds the cushion 80 against the trim carrier 78. The cover stock 82 may be removed by disengaging the securing rim 130 without disassembling other portions of the seating assembly, such that replacement of the cover stock 82 and/or cushion 70 is improved. The securing rim 130 is coupled to the cover stock 82 with a plurality of fasteners 140, shown as stitching. The fasteners 140 may conceivably include staples, rivets, and adhesive, among other conceivable fasteners. It is also conceived that the securing rim 130 may be extruded over the edge portion 128 of the cover stock 82, among other attachment means other than fasteners 140. It is contemplated that the cover stock 82 may also extends over the external peripheral gap 26 (FIG. 3), coupling with the seatback structure 15 to conceal the external peripheral gap 26. The cover stock 28 may conceivably be comprised of fabric, leather, elastic, or any other upholstery materials.

Figure 16:
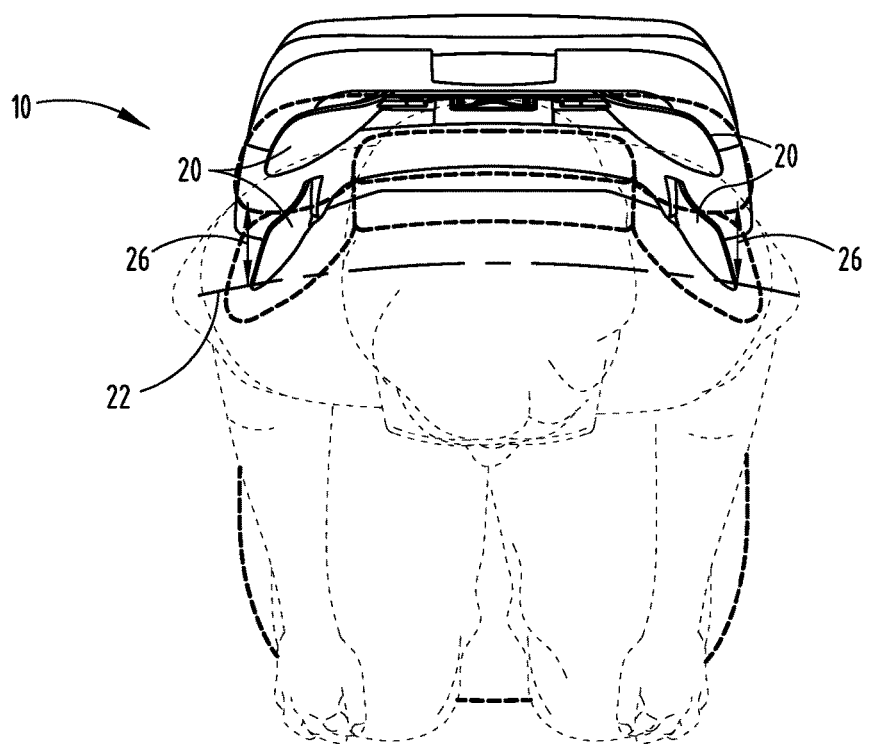
FIG. 16 is a top planar view of the suspension system shown in FIG. 2, having an occupant sitting in the vehicle seating assembly.
Figure 16A:
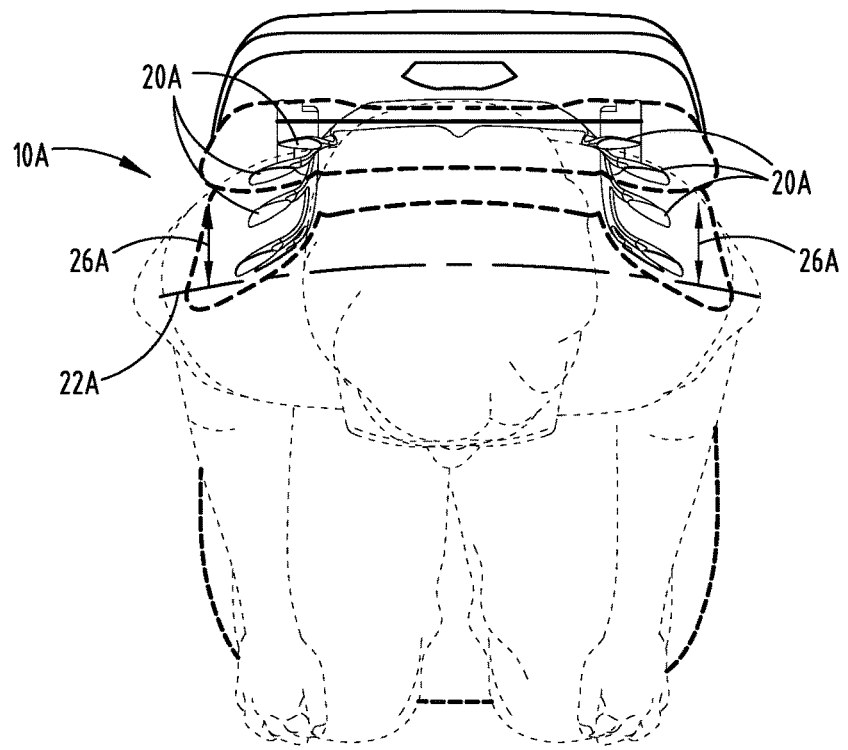
FIG. 16A is a top planar view of the additional embodiment of the suspension system shown in FIG. 2A, having an occupant sitting in the vehicle seating assembly.
Figure 17:
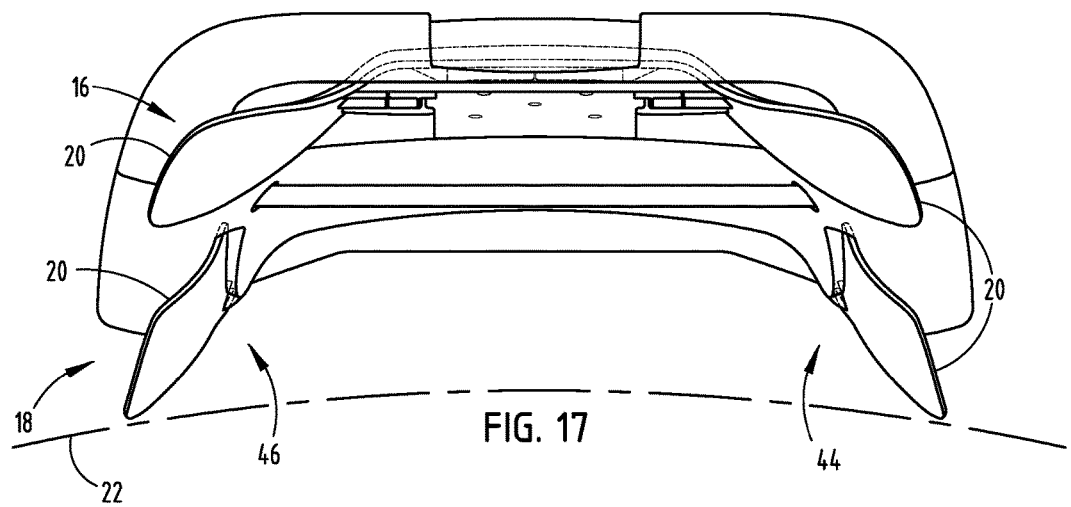
FIG. 17 is a top planar view of the suspension system shown in FIG. 16.
Figure 17A:
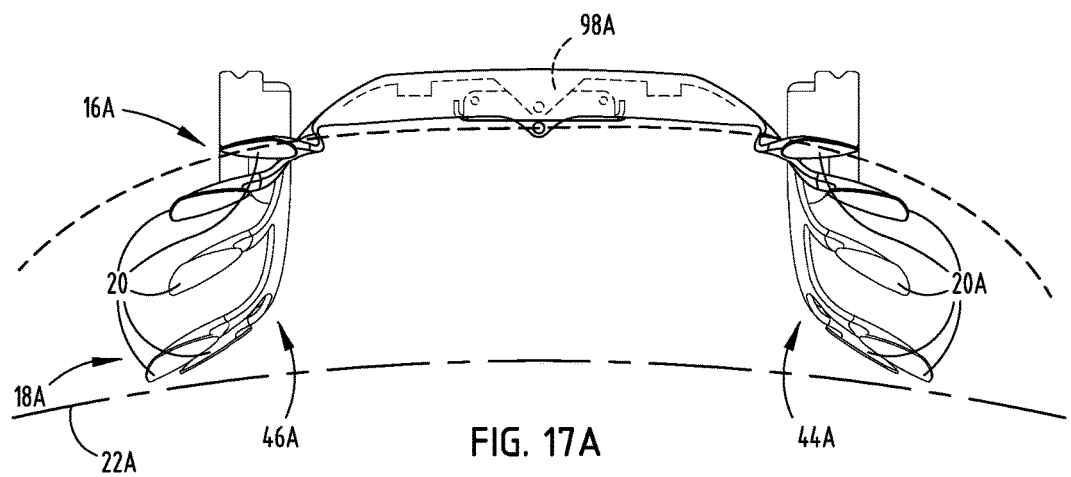
FIG. 17A is a top planar view of the additional embodiment of the suspension system shown in FIG. 16A.

Referring now to FIGS. 16-17, the suspension system 10 is shown with an occupant in an upright sitting position with the occupant's back resting against the passenger support 22 of the seatback 30. In such a position, the occupant is substantially distributing weight evenly to the flex members 20 on both sides of the suspension system 10. Accordingly, the flex members 20 of the upper component 16 and of the first and second portions 44, 46 of the lower component 18 are equally deformed rearward to absorb the weight of the occupant. As such, the external peripheral gap 26 is substantially equal on either side of the passenger support 22. As shown in FIGS. 16A-17A, the upper component 16A of the alternative embodiment is also not laterally pivoted about the fulcrum 98A, similarly maintaining the peripheral gap 26A at a substantially equal size on either side of the passenger support 22A.

Figure 18:
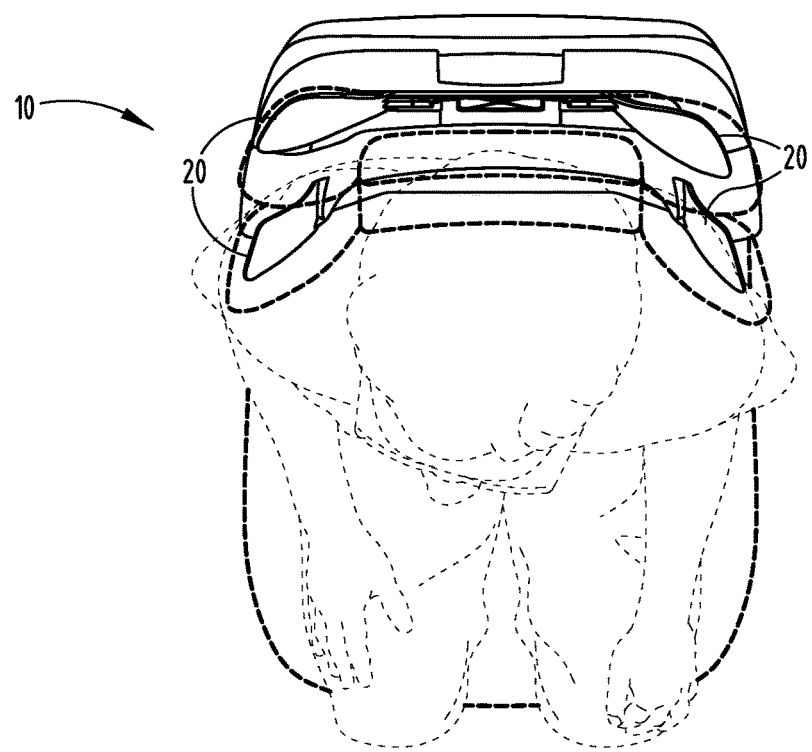
FIG. 18 is a top planar view of the suspension system shown in FIG. 16, having an occupant sitting in the vehicle seating assembly turned slightly to the right.
Figure 18A:
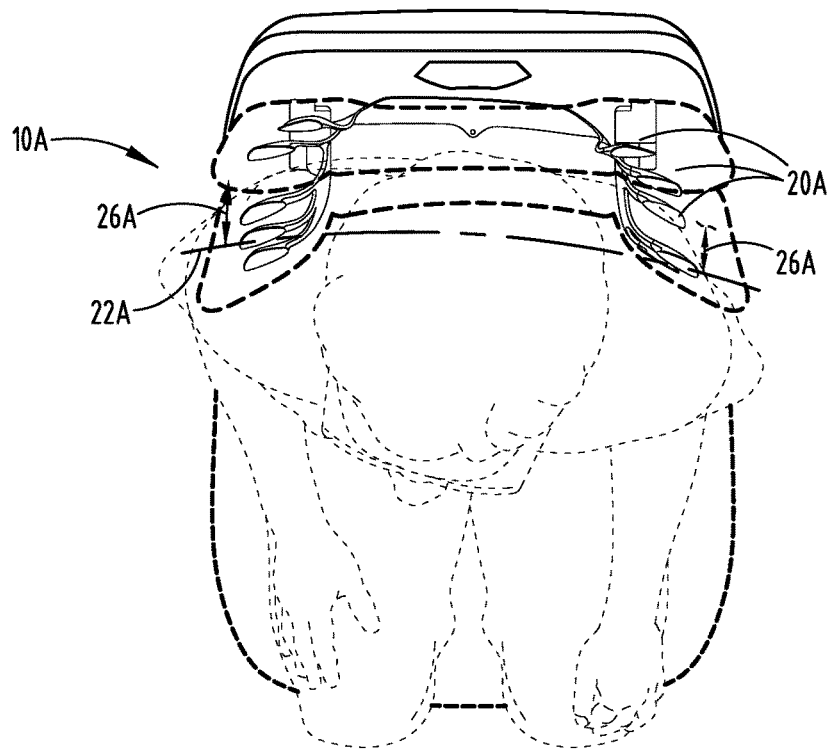
FIG. 18A is a top planar view of the additional embodiment of the suspension system shown in FIG. 16A, having an occupant sitting in the vehicle seating assembly turned slightly to the right.
Figure 19:
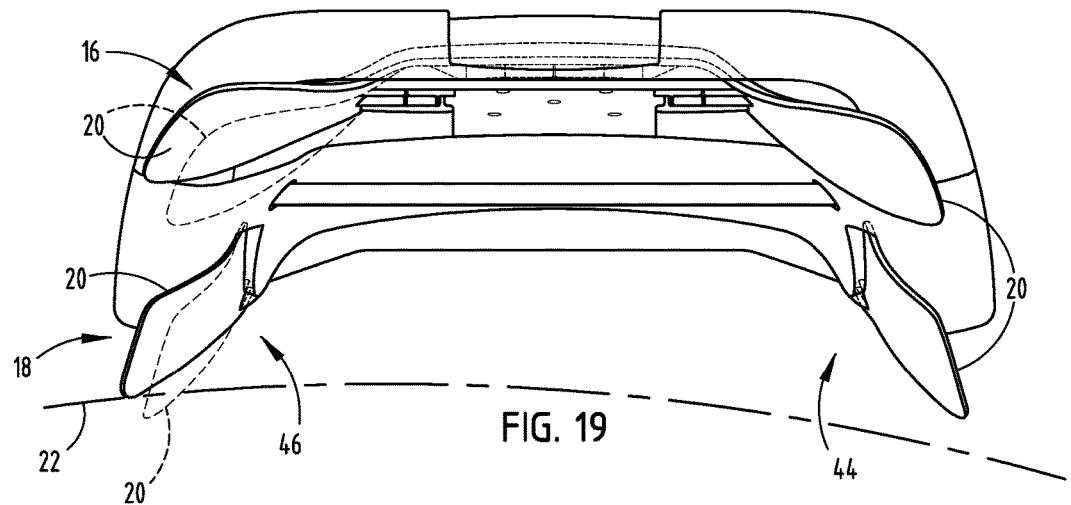
FIG. 19 is a top planar view of the suspension system shown in FIG. 18.
Figure 19A:
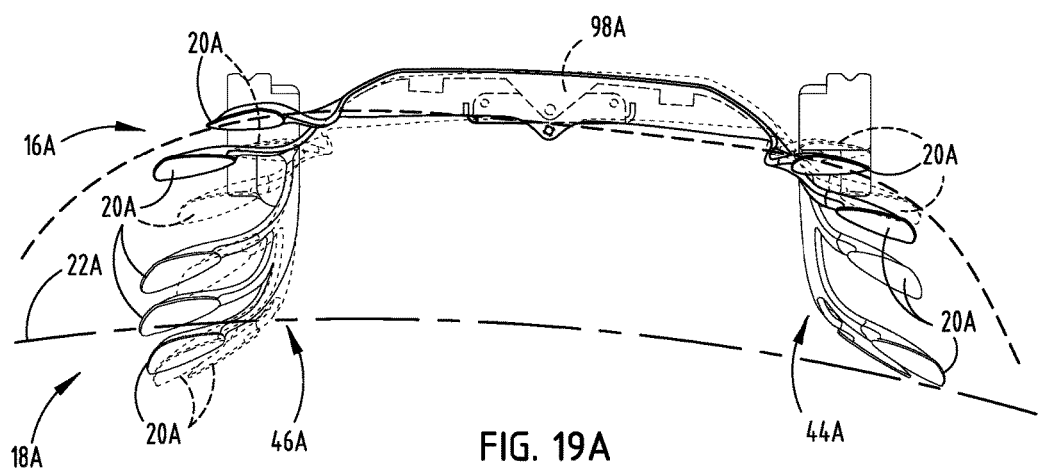
FIG. 19A is a top planar view of the additional embodiment of the suspension system shown in FIG. 18A.

As shown in FIGS. 18-19, the occupant has turned slightly to the right, adjusting the occupant's weight distribution on the suspension system 10. As such, the flex member 20 on the right side of the upper component 16 has flexed rearward, following the movement of the occupant's shoulders and upper back. The flex member 20 extending from the second side portion 46 of the lower component 18 also reacts to the occupant's illustrated movement by elastically deforming slightly rearward. The upper component is configured to allow for greater movement and deformation at the flex members 20 to accommodate to greater range of potential movement in an occupant's shoulder area than the occupant's lower back area. Accordingly, the external peripheral gap 26 is slightly reduced proximate the second side portion 46 of the lower component 18 and reduce relative more proximate the right side flex member 20 of the upper component 16.

In response to the occupant's movement, the additional embodiment, as shown in FIGS. 18A-19A, also includes the upper component 16A pivoted laterally to the right about the fulcrum 98A. The lateral pivoting movement of the upper component forces the flex members 20A on the right to move rearward and forces the flex members 20A to the left to move forward, following the movement of the occupant's shoulders and upper back. Accordingly, the external peripheral gap 26A proximate the upper component 16A is reduced on the right side of the passenger support 22A and slightly increased on the left side of the passenger support 22A.

Figure 20:
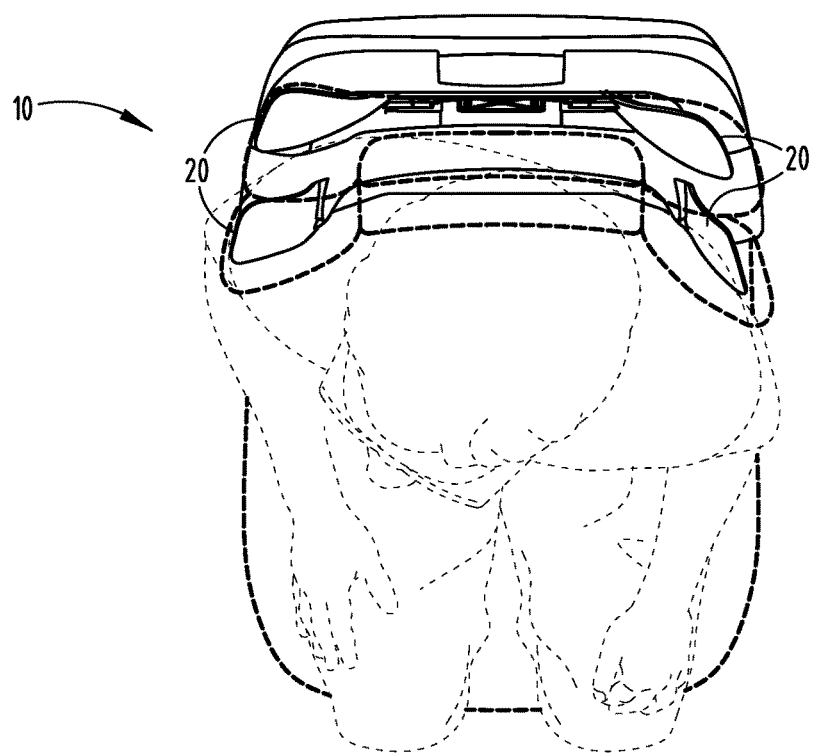
FIG. 20 is a top planar view of the suspension system shown in FIG. 18, having an occupant sitting in the vehicle seating assembly turned considerably to the right.
Figure 20A:
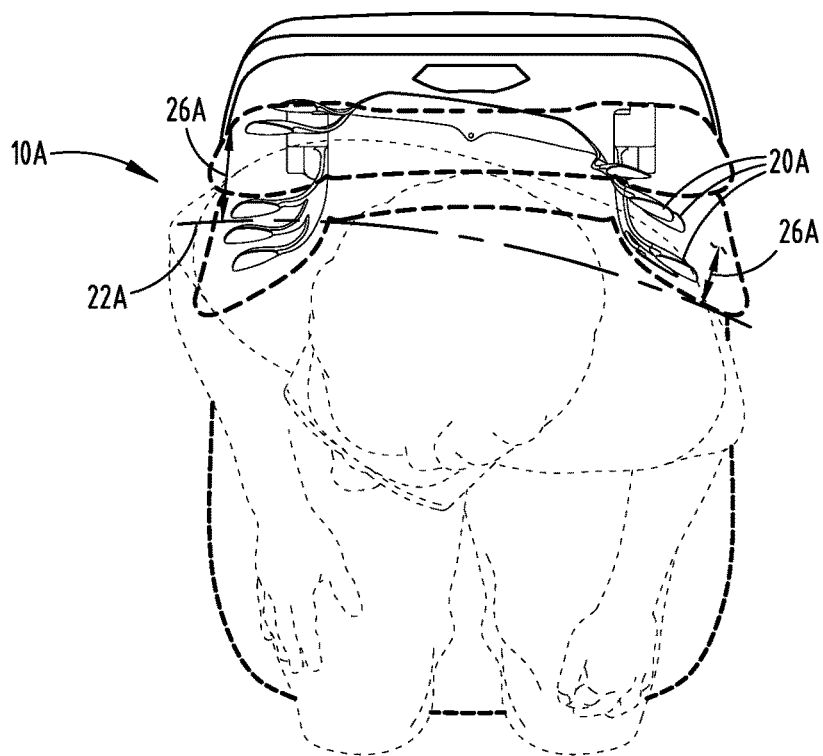
FIG. 20A is a top planar view of the additional embodiment of the suspension system shown in FIG. 18A, having an occupant sitting in the vehicle seating assembly turned considerably to the right.
Figure 21:
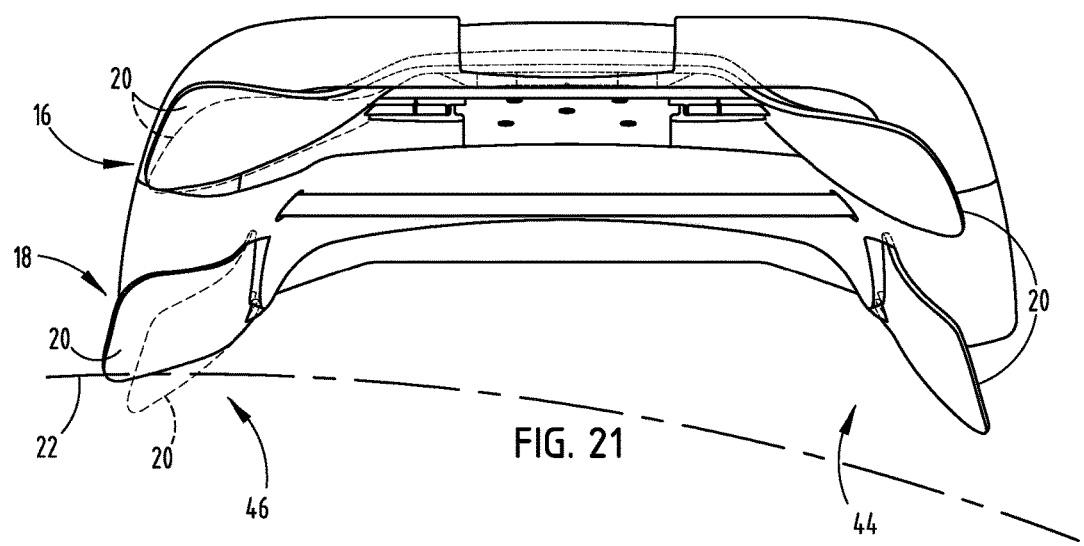
FIG. 21 is a top planar view of the suspension system shown in FIG. 20.
Figure 21A:
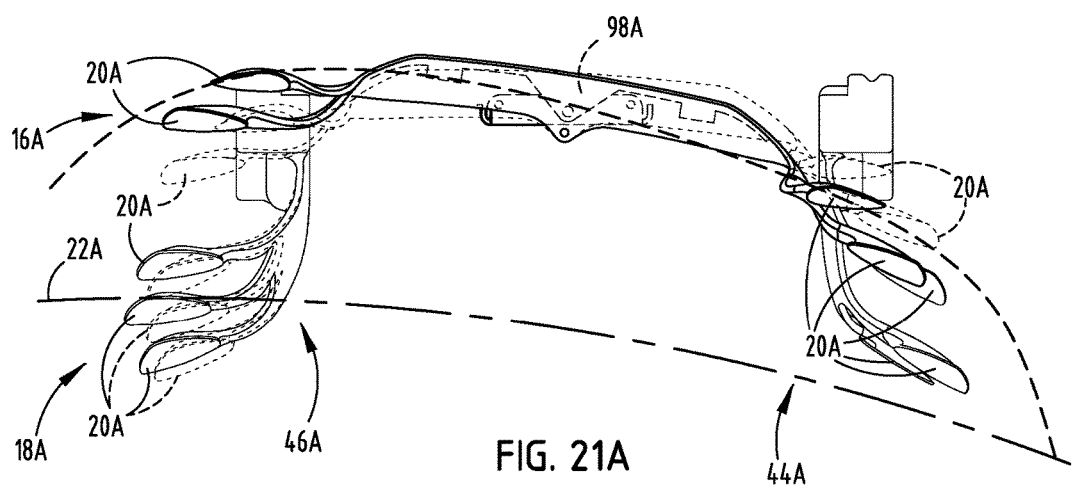
FIG. 21A is a top planar view of the additional embodiment of the suspension system shown in FIG. 20A.

As illustrated in FIGS. 20-21, the occupant has turned more to the right from the position shown in FIGS. 18-19, thereby further adjusting the occupant's weight distribution to the suspension system 10. In this position, the flex member 20 of the upper component 16 on the occupant's right side has elastically deformed further rearward to provide some resistance to the occupant's turning motion. The elastic deformation of the upper component 16, therefore, provides support to the occupant's upper back that adapts to movement and position changes of the occupant. Additional deflection also occurs to the flex member 20 extending from the second side portion 46 of the lower component 18 by further elastically deforming rearward, thereby also providing adaptable support to the occupants' lower back. As such, the external peripheral gap 26 is further reduced on the right side of the passenger support 22. It is contemplated that movement of the occupant back to the forward facing position shown in FIGS. 16-17 will result in the flex members 20 to elastically regain a substantially similar orientation and thereby regain the peripheral gap 26 with a substantially equal size on either side of the passenger support 22. Further, it is contemplated that movement of the occupant to the left that corresponds with the movement shown in FIGS. 18-21, will result in substantially mirrored deformation of the flex members on the left side of the suspension system 10.

With reference again to the additional embodiment, as shown in FIGS. 20A-21A, the occupant is similarly turned more to the right, such that the upper component 16A has continued to pivot laterally to the right about the fulcrum 98A. The pivotal movement about the fulcrum 98A again forces the flex members 20A on the right to move further rearward and the flex members 20A to the left to move further forward, in general alignment with the occupant's shoulders and upper back. The flex members 20A of the upper component 16A on the occupant's right side also elastically deform rearward to provide added resistance to the occupant's turning motion and adaptable support to the occupant's upper back.

Another alternative embodiment of the suspension system 10 is shown in FIGS. 22-24, similarly including an upper component 144 and a lower component 146. The upper component 144 has a first central body 148 this is pivotably coupled with a first cross bracket 150 spanning between the first and second side members 60, 62 of the metal frame 56. As such, the upper component 144 is configured to pivot laterally about the pivotal connection between the first central body 148 and the first cross bracket 150. The first central body 148 similarly includes two flex members 20 extending forward and laterally from both sides of the first central body 148 to engage a passenger support, such that the upper component 144 is configured to pivot and elastically deform to provide resistance to the occupant's turning motion and adaptable support to the occupant's upper back. However, the upper component 144 of this embodiment does not pivot forward relative to the lower component 146.

The lower component 146 of this alternative embodiment, as shown in FIGS. 22-24, includes a second cross bracket 152 that spans between the first and second side members 60, 62 of the metal frame 56. The lower component 146 also includes a second central body 154 that is pivotably coupled with the second cross bracket 152. The second central body 154 includes an upper portion 156 and a lower portion 158, which each have two flex members 20 extending forward and laterally outward from both the central body 154 to engage a passenger support. The flex members 20 of the upper and lower portions 156, 158 of the lower component 146 that are adjacent to each other integrally join at the distal ends thereof. As such, the lower component 146 engages a passenger support 22 at six distal ends of the flex members 20. The second cross bracket 152 includes a bulging portion 160 that is configured to fit between the upper and lower portions 156, 158 of the second central body 154, such that a pivot pin 162 extends though the upper portion 156, the bulging portion 160, and the lower portion 158 to provide a pivotal connection. The lower component 146, therefore, may pivot laterally about the pivot pin 162, similar to the upper component 16, to provide pivoting and elastically deforming resistance to the occupant's entire back.

As shown in FIG. 24, the second cross bracket 152 engages a rear flange 164 of the metal frame 56 that extends laterally from an interior face 165 of the metal frame 56. A bolt 166 extends through a first hole 168 in the rear flange 164 and then through a second hole 170 in the second cross bracket 152 to attach the second cross bracket 152 to the metal frame 56. A bushing 172 is disposed between the second cross bracket 152 and the metal frame 56 to increase effectiveness of the suspension system and reduce wear between the metal frame 56 and second cross bracket 152. The first cross bracket 150 similarly engages the metal frame 56 with a bushing 172 and bolt 166.

Figure 25:
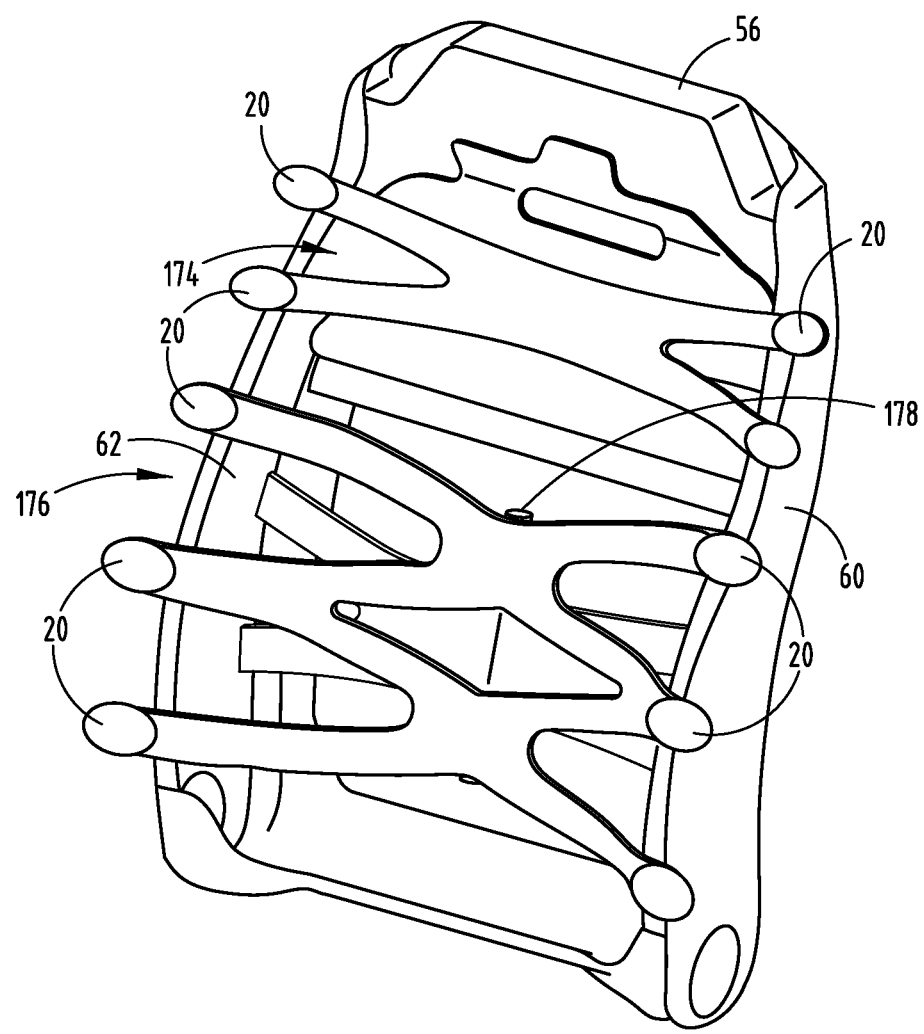
FIG. 25 is a top perspective view of an additional embodiment of a vehicle seating assembly.

Yet another alternative embodiment of the suspension system 10 is shown in FIG. 25, similarly including an upper component 174 and a lower component 176. In this embodiment, the upper and lower components 174, 176 span between the first and second side members 60, 62 of the metal frame 56 in more of a linear configuration. Further, the lower component 176 similarly includes a pivot pin 178 to allow lateral pivoting movement, in addition to the elastic deformation of the flex members 20. It this embodiment the upper component 174 does not pivot laterally, and alternatively adapts to any shifts in an occupant's weight or position by elastic deformation of the flex members 20.

Ultimately, the flex members 20 shown in the various embodiments provide localized deflection for a passenger that corresponds with the passenger's shifts in weight, shoulder movements, and other common passenger movements that may occur during operation of the vehicle 25 or other occurrences when the passenger is seated in the seating assembly 24. The localized deflection of the flex members 20 may be enhanced or customized for additional compliance to a passenger's size by using flex members 20 with varied thickness, shaped, and overall construction, such as removing and replacing the finger shaped flex members 20A of the additional embodiment, as shown in the A suffixed figures, with more rigid or more resilient flex members 20A. The localized deflection and overall compliance provided by the flex members 20, in conjunction with the entire suspension system 10, enhances the ride and comfort experienced by a passenger and provides the desired support characteristics.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seat suspension assembly comprising:
    a seatback structure;
    an upper component and a lower component pivotally coupled with the upper component, each component including at least two outwardly extending flex members having distal ends with forwardly-extending connection features;
    a flexible support having a periphery operably coupled to the connection features; and
    an external peripheral gap defined between the flexible support and the seatback structure.

2. The seat suspension assembly of claim 1, further comprising:
    snap-fit features disposed on a rear side of the flexible support that releasably engage the connection features of the upper component and the lower component.

3. The seat suspension assembly of claim 1, wherein the upper component is operably coupled to an upper segment of the flexible support and is translatable between a forward position and a rearward position.

4. The seat suspension assembly of claim 1, wherein the upper component is operably coupled with a motor that translates the upper component between the forward and rearward positions.

5. The seat suspension assembly of claim 1, wherein the upper component is pivotal about a pivot bar, and wherein the pivot bar is rotatably coupled to a first side portion and a second side portion.

6. The seat suspension assembly of claim 1, further comprising:
    an exposed trim piece disposed between a frame and the upper component.

7. The seat suspension assembly of claim 1, wherein the upper component and the lower component are each independently flexible under the weight of a passenger.

8. A seat suspension assembly comprising:
    first and second side supports defining a seatback frame;
    an upper component and a lower component, each including an outwardly extending flex member;
    a support having snap-fit engagement features operably coupled to distal ends of the flex member;
    an exposed trim piece disposed between the seatback frame and the upper component; and
    an external peripheral gap defined between sides of the support and the first and second side supports.

9. The seat suspension assembly of claim 8, further comprising:
    a removable cover stock disposed over the upper and lower components.

10. The seat suspension assembly of claim 8, wherein the cover stock includes a securing rim that secures the cover stock to the support.

11. The seat suspension assembly of claim 8, wherein the upper component includes a first flex member, a second flex member, and a central body disposed therebetween.

12. The seat suspension assembly of claim 8, wherein the upper component is operably coupled to an upper segment of the support operable between a forward position and a rearward position.

13. The seat suspension assembly of claim 8, wherein the upper component is operably coupled with a motor that translates the upper component between the forward and rearward positions.

14. The seat suspension assembly of claim 8, wherein the lower component includes a first side portion that is distinct and separate from a second side portion.

15. A seat suspension assembly comprising:
a seatback including first and second side supports;
an upper component rotatably coupled with the first and second side supports, the upper component having a suspension assembly with outwardly extending flex members;
a support operably coupled with the suspension assembly; and
an external peripheral gap defined between the support and the first and second side supports.

16. The seat suspension assembly of claim 15, further comprising:
a lower component including at least two outwardly extending flex members.

17. The seat suspension assembly of claim 16, wherein the lower component includes a first side portion and a second side portion, wherein the first side portion is distinct and separate from the second side portion.

18. The seat suspension assembly of claim 15, wherein the upper component includes a first flex member, a second flex member, and a central body disposed therebetween.

19. The seat suspension assembly of claim 18, wherein the upper component is operably coupled with a motor that translates the upper component between forward and rearward positions, and wherein the upper component is pivotal about a pivot bar that is rotatably coupled to a first side portion and a second side portion.

20. The seat suspension assembly of claim 15, further comprising:
a cover stock disposed over the upper and lower components, wherein the cover stock includes a securing rim on an edge portion of the cover stock that secures the cover stock to the support.

* * * * *